US012686165B2

(12) United States Patent
Wang et al.

(10) Patent No.: US 12,686,165 B2
(45) Date of Patent: Jul. 21, 2026

(54) ADDITIVE MANUFACTURING APPARATUS WITH POWDER-INTEGRATED PRECERAMIC MIXTURE AND RELATED METHODS

(71) Applicant: The Texas A&M University System, College Station, TX (US)

(72) Inventors: Shiren Wang, College Station, TX (US); Ruochen Liu, Bryan, TX (US); Aolin Hou, College Station, TX (US); Wei Li, College Station, TX (US); Jingjing Qiu, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 269 days.

(21) Appl. No.: 18/188,564

(22) Filed: Mar. 23, 2023

(65) Prior Publication Data

US 2023/0302724 A1     Sep. 28, 2023

Related U.S. Application Data

(60) Provisional application No. 63/269,785, filed on Mar. 23, 2022.

(51) Int. Cl.
B29C 64/153          (2017.01)
B29C 64/209          (2017.01)
(Continued)

(52) U.S. Cl.
CPC .......... B29C 64/153 (2017.08); B29C 64/209 (2017.08); B29C 64/255 (2017.08); (Continued)

(58) Field of Classification Search
CPC ... B29C 64/209; B29C 64/255; B29C 64/264; B29C 64/153; B29C 64/295; B29C 64/268; B29C 64/273; B29C 64/336
See application file for complete search history.

(56) References Cited

U.S. PATENT DOCUMENTS 6,129,872 A * 10/2000 Jang ........................ B29B 7/582
                                                    425/162
9,248,501 B1 * 2/2016 Johannes .................. B22F 9/24
(Continued)

FOREIGN PATENT DOCUMENTS

CN        108381924 A  *  8/2018  ............. B33Y 30/00
CN        108381924 B  *  3/2021  ............. B33Y 30/00
EP          3441377 A1 *  2/2019  ............. B28B 1/001

OTHER PUBLICATIONS

English Translation for CN 108381924 (Year: 2021).*
U.S. Appl. No. 18/188,658, filed Mar. 23, 2023 Wang et al.

*Primary Examiner* — Seyed Masoud Malekzadeh
(74) *Attorney, Agent, or Firm* — Allen, Dyer, Doppelt + Gilchrist, PA

(57)          ABSTRACT
An additive manufacturing apparatus includes powder supplies, a preceramic binder supply, and a mixer device downstream from the powder supplies and the preceramic binder supply and configured to generate a powder-integrated preceramic mixture. The additive manufacturing apparatus also includes a nozzle device downstream from the mixer device and configured to output the powder-integrated preceramic mixture, and a heat source configured to heat the powder-integrated preceramic mixture to initiate a self-sustainable ceramization reaction to generate a ceramic matrix composite.

20 Claims, 25 Drawing Sheets

(51) Int. Cl.

| | |
|---|---|
| B29C 64/255 | (2017.01) |
| B29C 64/264 | (2017.01) |
| C04B 35/80 | (2006.01) |
| *B33Y 10/00* | (2015.01) |
| *B33Y 40/10* | (2020.01) |
| *B33Y 70/10* | (2020.01) |

(52) U.S. Cl.

CPC ............ B29C 64/264 (2017.08); C04B 35/80 (2013.01); *B33Y 10/00* (2014.12); *B33Y 40/10* (2020.01); *B33Y 70/10* (2020.01); *C04B 2235/5208* (2013.01)

(56) References Cited

U.S. PATENT DOCUMENTS

| | | | | |
|---|---|---|---|---|
| 9,956,725 | B2 * | 5/2018 | Mark ..................... | B33Y 30/00 |
| 10,099,427 | B2 * | 10/2018 | Mark ..................... | B29C 64/106 |
| 10,254,499 | B1 * | 4/2019 | Cohen ...................... | G02B 6/25 |
| 10,259,209 | B2 * | 4/2019 | Czaplewski .......... | B29C 64/209 |
| 10,464,257 | B2 * | 11/2019 | Boccaccini ....... | C04B 35/62863 |
| 10,507,638 | B2 * | 12/2019 | Nuechterlein ......... | B33Y 10/00 |
| 10,571,642 | B1 * | 2/2020 | Cohen ...................... | G02B 6/25 |
| 11,065,861 | B2 * | 7/2021 | Mark ..................... | B33Y 50/02 |
| 11,148,409 | B2 * | 10/2021 | Mark ..................... | B29C 64/118 |
| 2015/0021379 | A1 * | 1/2015 | Albrecht ................... | B05B 7/22 |
| | | | | 219/76.1 |
| 2015/0021815 | A1 * | 1/2015 | Albrecht ............... | B23K 9/232 |
| | | | | 425/162 |
| 2016/0136897 | A1 * | 5/2016 | Nielsen-Cole ........ | B29C 64/393 |
| | | | | 425/150 |
| 2016/0271878 | A1 * | 9/2016 | Nuechterlein ......... | B33Y 10/00 |
| 2017/0334132 | A1 * | 11/2017 | Boccaccini ........... | C04B 35/657 |
| 2017/0343984 | A1 | 11/2017 | Czinger et al. | |
| 2018/0154438 | A1 * | 6/2018 | Mark ..................... | B33Y 40/20 |
| 2018/0207863 | A1 * | 7/2018 | Porter ..................... | B29C 64/40 |
| 2018/0243988 | A1 * | 8/2018 | Lewicki ............... | B29C 64/245 |
| 2018/0311757 | A1 | 11/2018 | Bucknell et al. | |
| 2018/0311769 | A1 | 11/2018 | Tenhouten et al. | |
| 2018/0339466 | A1 | 11/2018 | El Naga et al. | |
| 2019/0039138 | A1 | 2/2019 | Zafar et al. | |
| 2019/0070778 | A1 * | 3/2019 | Haid ..................... | B33Y 10/00 |
| 2019/0077047 | A1 * | 3/2019 | Andrews ............... | C09D 5/035 |
| 2019/0391563 | A1 | 12/2019 | Macey et al. | |
| 2020/0061918 | A1 * | 2/2020 | Branham ............. | B29C 64/205 |
| 2020/0079028 | A1 | 3/2020 | Miller et al. | |
| 2020/0114422 | A1 * | 4/2020 | Mark ................... | B29C 64/118 |
| 2020/0230870 | A1 | 7/2020 | Lakshman et al. | |
| 2021/0170517 | A1 | 6/2021 | El Naga et al. | |
| 2021/0187824 | A1 * | 6/2021 | Moosberg ............... | B22F 10/16 |
| 2021/0229208 | A1 | 7/2021 | Yang et al. | |
| 2021/0229357 | A1 | 7/2021 | Yang et al. | |
| 2021/0252803 | A1 | 8/2021 | John et al. | |
| 2021/0268738 | A1 | 9/2021 | Kenworthy | |
| 2022/0088608 | A1 | 3/2022 | Teng et al. | |
| 2022/0088685 | A1 | 3/2022 | Kenworthy et al. | |
| 2022/0176449 | A1 | 6/2022 | Lakshman et al. | |
| 2022/0288693 | A1 | 9/2022 | Kenworthy et al. | |
| 2022/0314493 | A1 * | 10/2022 | Andrews ............. | B29C 48/286 |
| 2022/0339875 | A1 | 10/2022 | Czinger et al. | |

* cited by examiner

1000

1020

1030

1040

1041

1050

1080

1170

1210

1230

1260

1310

ADDITIVE MANUFACTURING APPARATUS WITH POWDER-INTEGRATED PRECERAMIC MIXTURE AND RELATED METHODS

RELATED APPLICATION

This application is based upon prior filed copending Application No. 63/269,785 filed Mar. 23, 2022, the entire subject matter of which is incorporated herein by reference in its entirety

TECHNICAL FIELD

The present disclosure relates to the field of manufacturing, and, more particularly, to additive manufacturing and related methods.

BACKGROUND

Ceramics are among the few manufactured materials that date to the beginning of human civilization. Because of some key exceptional properties including long service time, chemical inertness, and high-temperature resistance1, ceramics' critical role has extended from ancient artistic and domestic use to modern applications in automotive, aviation, aerospace, information technology, and healthcare industries. However, ceramics are inherently difficult to process. The ceramic industries have been considered energy-intensive with their over 400 Mt $CO_2$ emission per year. High-temperature firing and cooling are the most time-intensive and energy-intensive steps during the ceramic manufacturing process. Specifically, the conventional processes typically take hours to days and it consumes over 182 terawatt hour (TWh) energy per year, representing over 75% of the global ceramic manufacturing energy use.

SUMMARY

Generally, an additive manufacturing apparatus includes a plurality of powder supplies, a preceramic binder supply, and a mixer device downstream from the plurality of powder supplies and the preceramic binder supply and configured to generate a powder-integrated preceramic mixture. The additive manufacturing apparatus also includes a nozzle device downstream from the mixer device and configured to output the powder-integrated preceramic mixture, and a heat source configured to heat the powder-integrated preceramic mixture to initiate a self-sustainable ceramization reaction to generate a ceramic matrix composite. In particular, the powder-integrated preceramic mixture comprises a reactive powder-integrated preceramic oligomer.

Additionally, the nozzle device may include an input funnel coupled to an output of the mixer device, and a mixing chamber coupled downstream from the input funnel. The mixing chamber may comprise a motor, and an auger powered by the motor. The plurality of powder supplies may comprise a plurality of inorganic reactive powder supplies. The preceramic binder supply may comprise a preceramic oligomer binder supply. The additive manufacturing apparatus may also comprise an ultraviolet (UV) radiation source configured to cure the powder-integrated preceramic mixture before initiating a self-sustainable ceramization reaction.

In some embodiments, the additive manufacturing apparatus may further comprise a fiber supply configured to feed a continuous fiber into the nozzle device to be dispensed within the powder-integrated preceramic mixture. The heat source may comprise a resistive heating device. For example, the heat source may be configured to heat the powder-integrated preceramic mixture for set time period and deliver less than 2000 Joules of energy to initiate the self-sustainable ceramization reaction.

Another aspect is directed to a method for additive manufacturing. The method comprises operating a mixer device downstream from a plurality of powder supplies and a preceramic binder supply and configured to generate a powder-integrated preceramic mixture, and operating a nozzle device downstream from the mixer device and configured to output the powder-integrated preceramic mixture. The method also includes operating a heat source configured to heat the powder-integrated preceramic mixture to initiate a self-sustainable ceramization reaction to generate a ceramic matrix composite.

DETAILED DESCRIPTION

Figure 1:
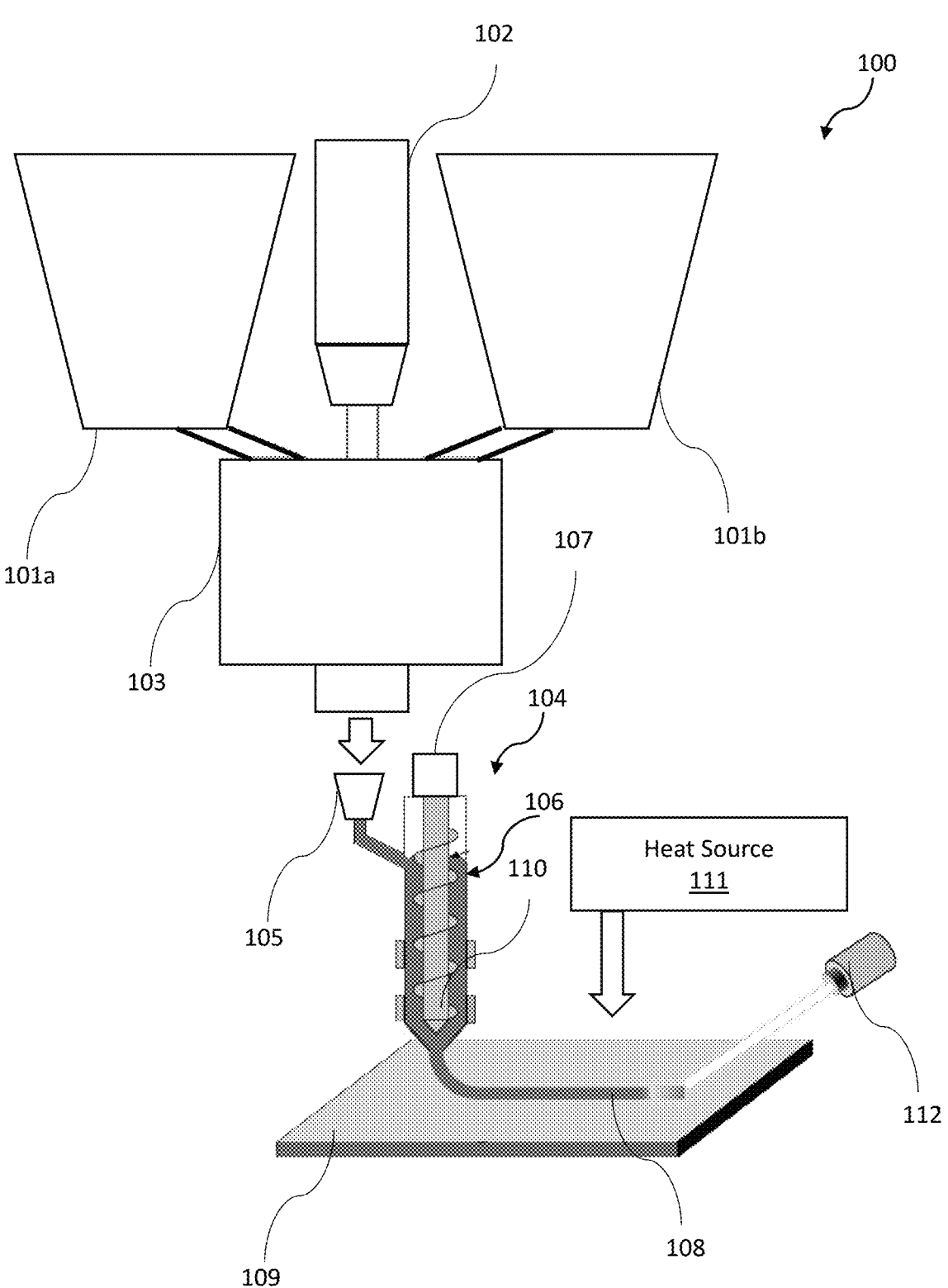
FIG. 1 is a perspective view of a first embodiment of an additive manufacturing apparatus, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Generally, an additive manufacturing apparatus may comprise multiple types of powder supplies that are reactive (e.g., silicon powder, amorphous carbon powder, titanium powder, silicon carbide powder). The additive manufacturing apparatus also may include a preceramic binder supply (e.g., polycarbosilane preceramic binder). The additive manufacturing apparatus also may include a mixer device downstream from the first and second powder supplies and the preceramic binder supply.

The additive manufacturing apparatus also may include a heating device to heat one or more of the first and second powder supplies and the mixer device. The additive manufacturing apparatus also includes a nozzle device downstream from the mixer device. The additive manufacturing apparatus also may include an electromagnetic irradiation unit to harden the deposited reactive ink.

The nozzle device may include an input funnel coupled to an output of the mixer device, and a mixing chamber coupled downstream from the input funnel. The nozzle device can also be a core-shell structure where the continuous fiber can be fed through the core with the reactive ink being outer shell. The mixing chamber may comprise a motor, and an auger power by the motor.

Figures 2A, 2B:
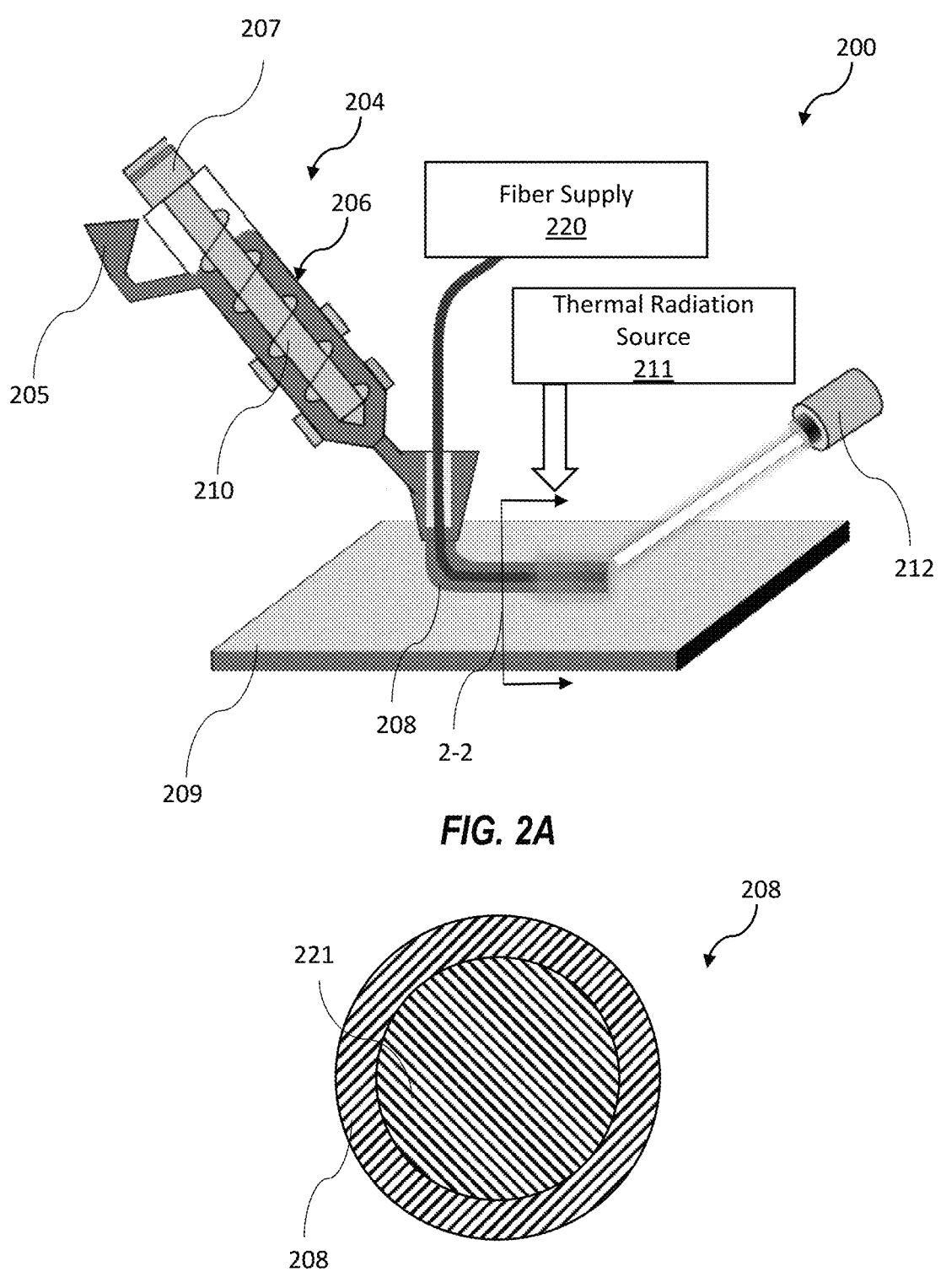
FIG. 2A is a perspective view of a second embodiment of the additive manufacturing apparatus, according to the present disclosure.
FIG. 2B is a cross-sectional view of the additive manufacturing apparatus of FIG. 2A along line 2-2.
Figure 3:
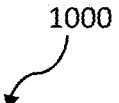
FIG. 3 is an image of a printing process, according to the present disclosure.
Figure 3:
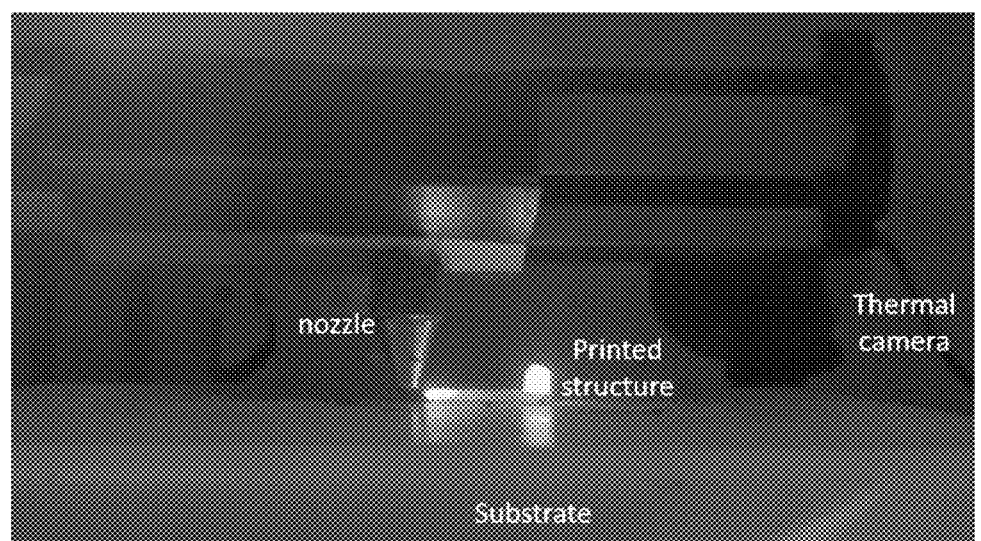
Figure 4A:
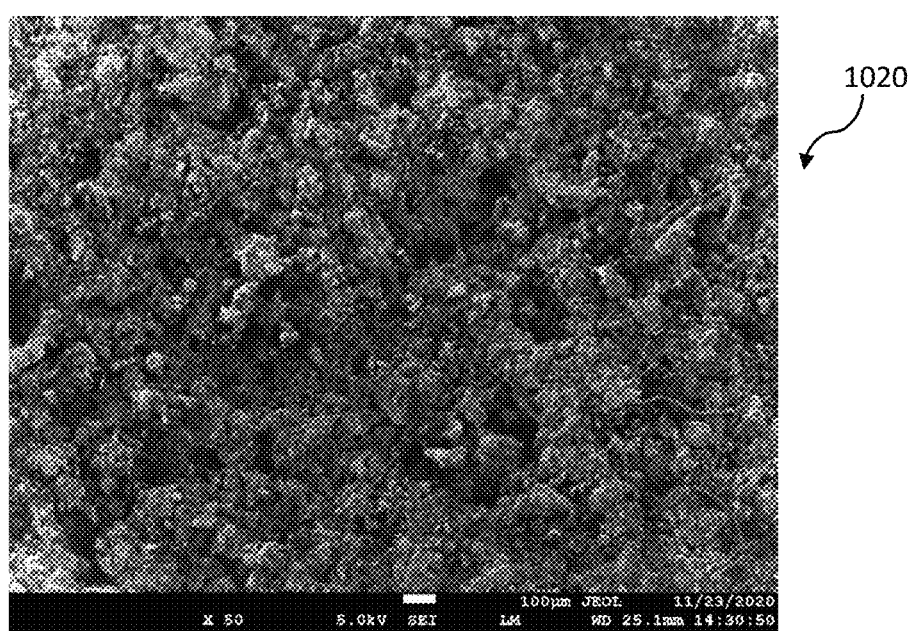
FIGS. 4A and 4B are images of a reactive ink before printing and the reactive additive manufactured structure after printing, respectively, according to the present disclosure.
Figure 4B:
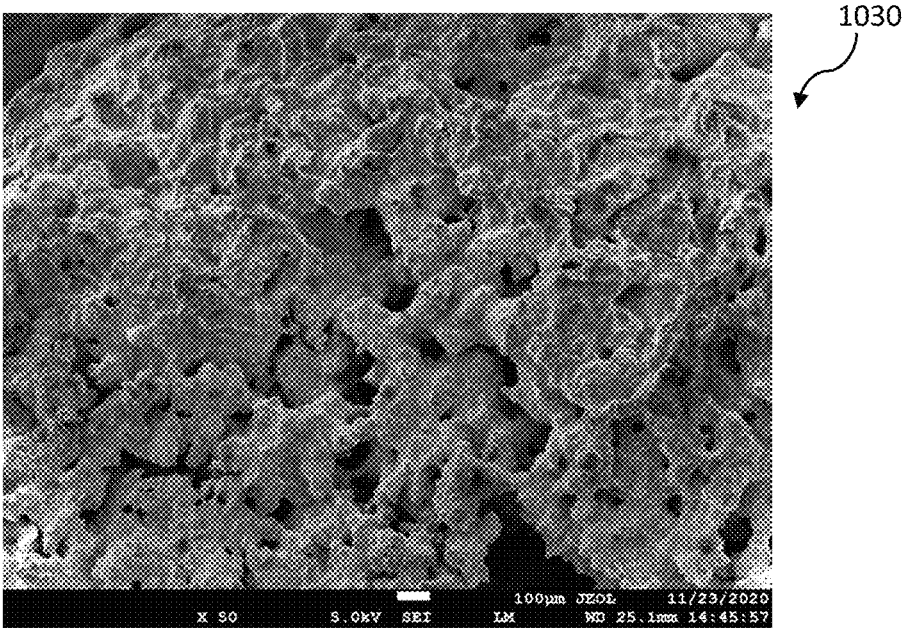

The implementation of extrusion-based reactive additive manufacturing of ceramics includes three steps: preparing reactive ink, printing, and reactive consolidation. The printing and reactive consolidation can be done continuously or in two separate steps. The reactive ink comprises: 1. multicomponent powders that can undergo self-propagation reactions to produce desired ceramic material, and 2. preceramic binders whose thermal decomposition leads to formation of ceramics. One example combination is silicon powder, amorphous carbon powder, titanium powder, and polycarbosilane preceramic binder. The 3D printing process can be done by extrusion-based technique where the reactive ink is fed through a nozzle and deposited on a printing substrate. The motion and extrusion process of the extruder is digitally controlled so that the deposited ink forms a desired pattern. The deposited reactive ink can be cured in-situ by external devices (e.g., UV light). The self-propagation reaction can be triggered by an external heating unit, for example, a laser or a torch. To achieve synchronized printing and reactive consolidation, the speed of printing is tuned according to the speed of self-propagation reaction so that the reactive consolidation front follows immediately after the extruded reactive ink, as shown in FIG. 1. Additionally, continuous fibers can be fed through the core of a core-shell nozzle and deposited together with the reactive ink as the shell as shown in FIGS. 2A-2B to fabricate continuous fiber reinforced ceramic matrix composite. The horizontal cross-section illustration of the extruded continuous fiber composite is shown in FIG. 2B.

Alternatively, the ceramic printing process can be done separately from reactive consolidation. The reactive ink may include monomeric/oligomeric preceramic binders can be first printed to form desired 3D structure, and thermal curing, photothermal curing, or microwave assisted curing process can be used to harden the preceramic binder. Finally, the reactive consolidation can be triggered by external heating unit.

The present disclosure includes a method for 3D printing reactive inks through extrusion. The printing system and ink compositions are designed for low cost, easy processing, and improved part density, which are challenges of ceramic additive manufacturing. To be specific, the one-step printing process is achieved by computer-controlled extrusion and on-the-spot reaction of reactive powder/preceramic binder mixture. The mixture, upon deposited on printing substrate, undergoes self-propagating reaction by heating on one end of printed ink. The highly heat-releasing reaction of reactive powder decomposes preceramic binders and produces reaction products. The binder-derived materials thus help reduce the porosity of the printed part. The printing process is compatible with continuous fiber incorporation and the printed continuous carbon fiber reinforced ceramic matrix composites possess improved mechanical performances. This can be enabled by the in-situ hardening of reactive ink that anchors the deposited flexible continuous fiber. The hardening can be induced by either in-situ curing of preceramic polymer binder by external energy source (e.g., UV light), or synchronized self-propagation reaction. This technology can produce ceramic and ceramic matrix composite parts with low cost and low porosity. The new additive manufacturing scheme can benefit the manufacturing of ceramics, ceramic matrix composite and high temperature materials, which has wide application in aerospace and aviation industries.

Advantageously, the disclosed embodiments reduce the porosity of the ceramic part produced by the additive manufacturing process. At the same time, the disclosed embodiments may provide for an increase in fabrication throughput. The technology may reduce the cost of ceramic additive manufacturing process. The disclosed embodiments may also provide for high throughput additive manufacturing of continuous fiber reinforced ceramics.

In general, the embodiments of the present disclosure use preceramic binders, which pyrolysis under the self-propagation reaction condition (i.e., inert gas environment, >2000° C. reaction temperature); the reactive powder/binder mixture can produce ceramic part with improved density. The preceramic binders used here are uniquely designed as not only a rheological modifier that enable the extrusion of feedstock powders, but also densifier that produce ceramic compounds upon pyrolysis.

Despite the reduced porosity, the disclosed embodiments simultaneously enable one step, in-situ additive manufacturing of ceramics and continuous fiber reinforced ceramic matrix composites in an energy efficient way. This is facilitated by the synchronization of extrusion deposition of reactive ink and self-propagation reaction that consolidate the reactive powders. The self-propagation reaction process only requires small amount of external energy input, for example, a transient initiation energy (i.e., time duration of <5 s) and the rest of printing process proceeds without external energy input. This feature significantly reduces the energy consumption cost associated with traditional ceramic manufacturing and mold production processes. In addition, the ink mixing, printing, and consolidation processes are continuous, thus it enables on-demand feedstock supply. These unique features reduce the requirement for complicated sintering/firing process and associated payloads, which reduces the cost and increased the flexibility of the ceramic manufacturing process.

In existing prior art approaches, achieving a dense structure has been one of the most important focuses of ceramic additive manufacturing technology. The consolidation and densification usually involve a series of thermal processes. Ceramic additive manufacturing processes assisted by binders are of interest due to their fast printing and fabrication speed, but they usually suffer from high porosity issues. There are some approaches to this problem. For example, for binder jetting (3DP from Emanuel Sachs) and material extrusion processes (Sandia Corporation), the densification treatments include debinding, sintering, and various post processing, such as infiltration and isostatic pressing. Although these methods can achieve even fully dense parts for desired mechanical property, this is achieved at the sacrifice of manufacturing speed with extra steps, which increased the cost and duration of the manufacturing. Additionally, one approach disclosed an ink composition for self-propagation reactive manufacturing; the water and small molecule based solvent as binders lead to high porosity and poor mechanical property of the fabricated part.

Currently, manufacturing of continuous fiber reinforced ceramic matrix composites is restricted to multi-step processes, such as polymer infiltration pyrolysis, reactive melt infiltration and chemical vapor infiltration, which are time, labor, and energy intensive. Furthermore, the post processing process is intrinsically challenging due to the robust chemical and mechanical nature of continuous fiber reinforced ceramic matrix composites. Also, manufacturing of continuous fiber reinforced ceramic matrix composites parts usually are restricted in design flexibility.

The disclosed embodiments may provide an alternative to existing approaches: 1) redesign the printing ink composition by incorporating preceramic binders; and 2) invent new printing systems that is compatible with mix-and-print fabrication process. The unique features enable a high density part with desired mechanical property to be manufactured in high throughput fashion.

Currently, a large amount of ceramic additive manufacturing fabrication cost is spent on firing and thermal treatment processes. The disclosed embodiments' unique strategy, including continuous production, self-propagating in-situ fabrication and densification, and avoids extensive cost related to power input and post densification treatment. These features reduce costs in payloads, labor, and power consumption. The disclosed embodiments may enable additive manufacturing of continuous fiber reinforced ceramic matrix composites.

In experimental applications using an exemplary embodiment of the present disclosure, the in-situ formed, as-printed part has a porosity of ~55%, which is comparable to and even smaller than some parts produced by binder jetting printing and sintering process (i.e., 0~65%). And the value is significantly smaller than porosity (>90%) of the part produced with non-preceramic binders (e.g., water or other polymer based). The prototype has a printing speed is ~8,000 cm$^3$/min, which is determined by the self-propagation reaction speed. The forming process solely is comparable to or greater than existing method, such as like binder jet printing, selective laser sintering, and extrusion based method. For example, binder jet printing technology has a printing speed of 10,000 cm$^3$/min; and SLS technology has a printing speed of ~800 cm$^3$/min. However, the debinding and sintering process of binder based methods usually takes hours (>90 min), making the disclosed embodiments stand out in terms of overall high throughput and low energy related cost.

Figure 5A:
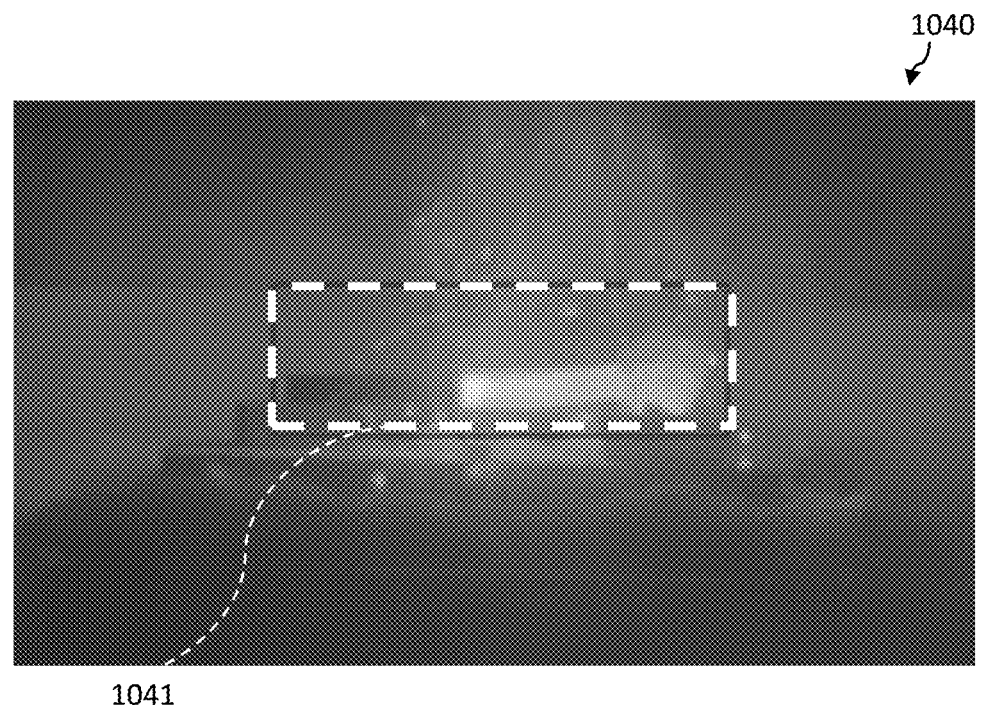
FIG. 5A is an image of the reacting ink, according to the present disclosure.
Figure 5B:
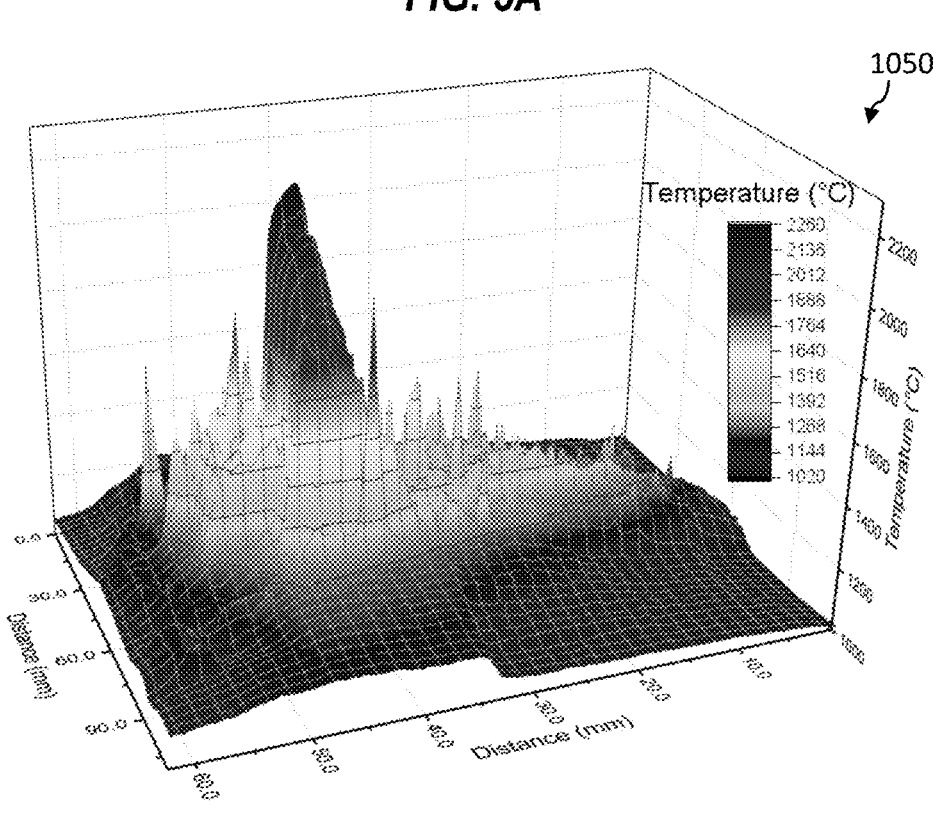
FIG. 5B is a diagram of temperature mapping of the reacting ink from FIG. 5A.
Figure 6A:
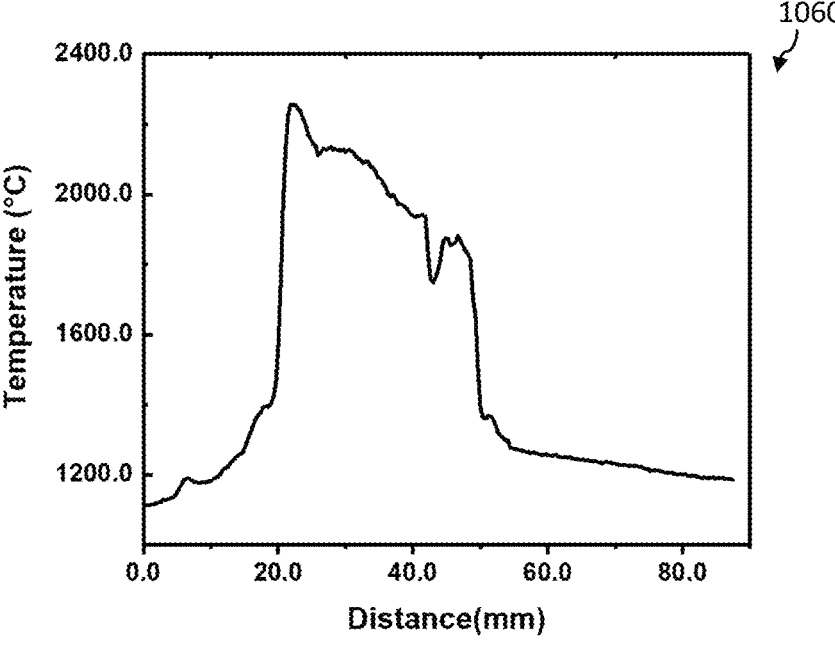
FIGS. 6A, 6B, & 6C are diagrams of spatial and temporal evolution of a temperature profile with an axial temperature profile of the reacting ink, a plot of reaction front propagation distance versus time, and a temporal evolution of a selected spot on the reactive ink, respectively, according to the present disclosure.
Figure 6B:
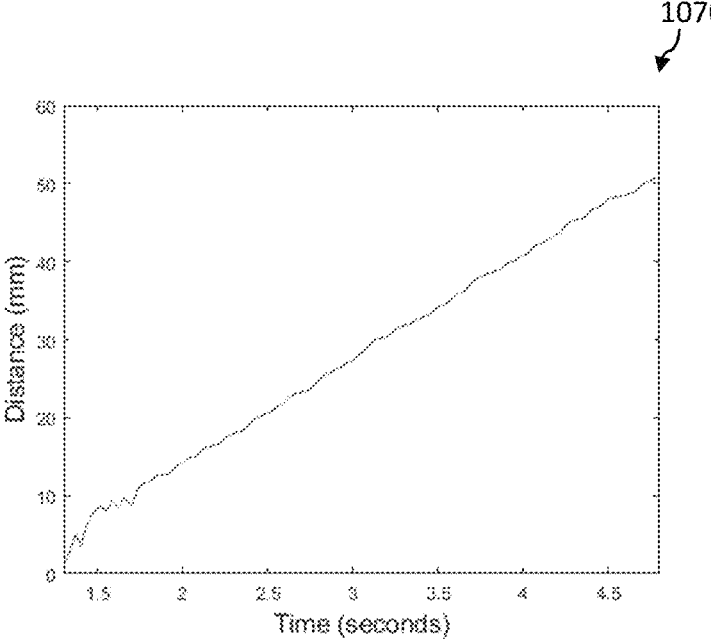
Figure 6C:
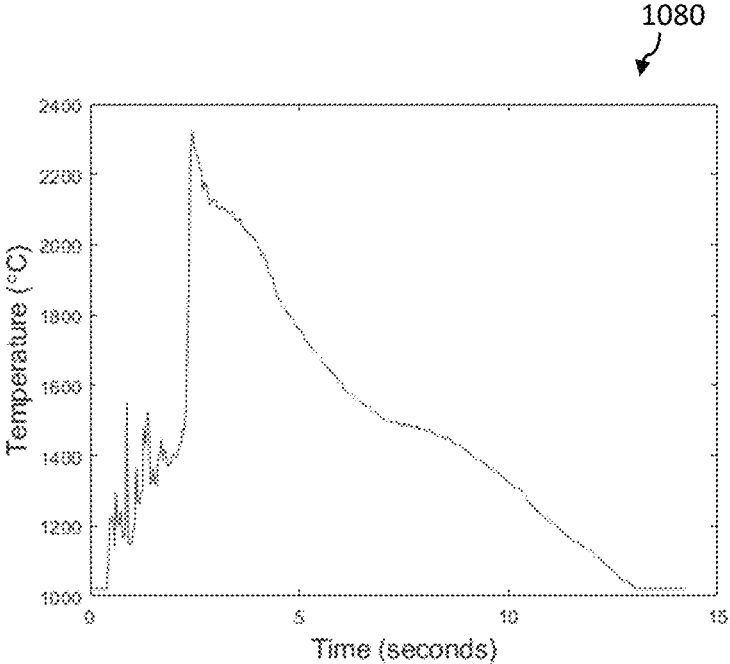

Referring now to FIGS. 3, 4A-4B, 5A-5B, 6A-6C, several images and diagrams demonstrate performance metrics for the additive manufacturing embodiments of the present disclosure. Image 1000 (with annotations) shows a printing process, and images 1020, 1030 show a reactive ink before printing and the reactive additive manufactured structure (i.e., after printing). FIG. 5A includes an image 1040 of an area of interest 1041 for the reacting ink within the area of interest. Diagram 1050 shows a temperature mapping of the reacting ink within the area of interest 1041.

Diagrams 1060, 1070, 1080 show a spatial and temporal evolution of a temperature profile with an axial temperature profile of the reacting ink, a plot of reaction front propagation distance versus time, and a temporal evolution of a selected spot on the reactive ink, respectively.

To enable more environmentally friendly ceramic manufacturing and boost manufacturing efficiency, researchers have proposed innovative consolidation processes to replace high-temperature firing, including microwave-assisted sintering, laser sintering, spark plasma sintering (SPS), and flash sintering. However, these techniques ubiquitously rely on external energy, such as external field and heat, induced phase transformation and consolidation. Due to the outside-in energy transfer mechanism, they usually require expensive equipment, and the energy efficiency and manufacturing rate are constrained by the size and geometry of the ceramic part. In addition, it remains challenging to integrate these more efficient approaches with additive manufacturing, which meets the need for freeform design and manufacturing of application-specific parts with complex geometries. Self-propagating high-temperature synthesis (SHS), on the other hand, utilizes the raw materials' internal energy to rapidly convert them to the ceramic product with a self-sustaining reaction wave. Although the self-sustaining reaction of the organic compound has been successfully integrated with various manufacturing technologies, such as frontal polymerization, high-performance complex shape ceramic part remains difficult to be fabricated by SHS due to the constraint of inorganic powder-based technique. Therefore, it may be helpful to develop a rapid and energy-efficient ceramic fabrication technology that integrates freeform shaping and a fast, low carbon footprint ceramization reaction process to efficiently decarbonize ceramic industries and mitigate the climate effect.

In the present disclosure, a rapid, energy-efficient, and simple ceramic manufacturing approach that integrates self-sustaining ceramization reaction with a direct-ink writing-based freeform manufacturing process (rapid energy-efficient AM process (REAP)). The unique reactive ink design allows extrusion-based 3D printing to first shape the ceramic preform, and a self-sustainable ceramization reaction can transform the preform into the ceramic structure in a rapid and energy-efficient manner. The reaction only requires a transient external thermal energy to initiate (e.g., 192 W for 10 seconds), and the exothermic reaction can proceed through the entire part at the speed of 130 cm/min without the presence of additional energy input. As such, the ceramization reaction demonstrates reduced energy consumption and time for ceramic structure production both by 1000 times as compared to typical furnace sintering. Importantly, the disclosed embodiments using REAP have an exceptionally low manufacturing carbon footprint with a greenhouse gas (GHG) emission of 2.23 kg $CO_2$ equivalent/kg. Moreover, the REAP technology is capable of fabricating technical-grade ceramic structures with decent mechanical performance and multifunctionalities. Such a rapid and energy-efficient manufacturing process could be an enabler of an efficient and sustainable ceramic industry toward powerful applications.

Figure 7:
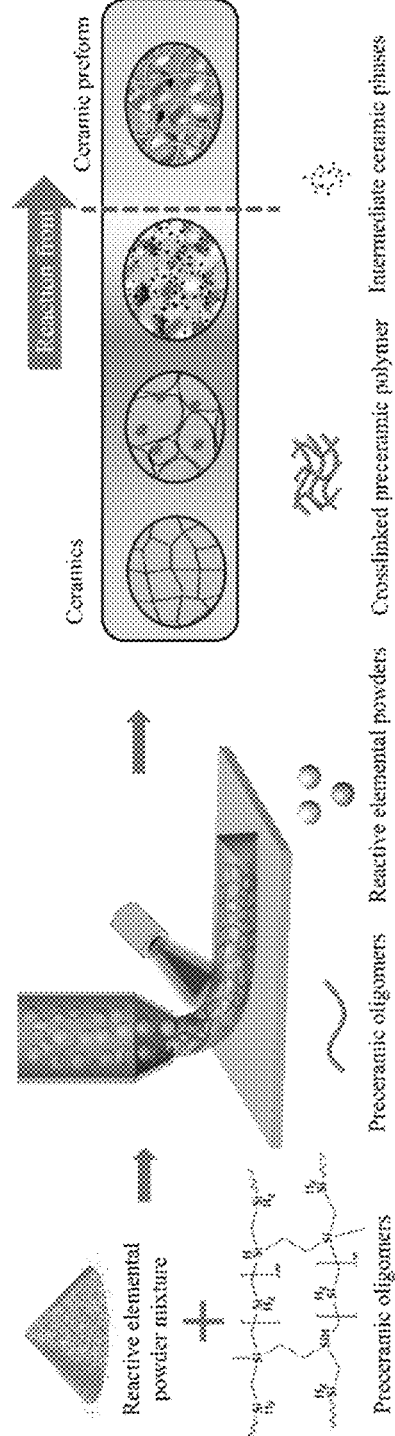
FIG. 7 is a schematic diagram of a self-sustaining ceramization integrated freeform manufacturing of ceramics, according to the present disclosure.
Figure 8:
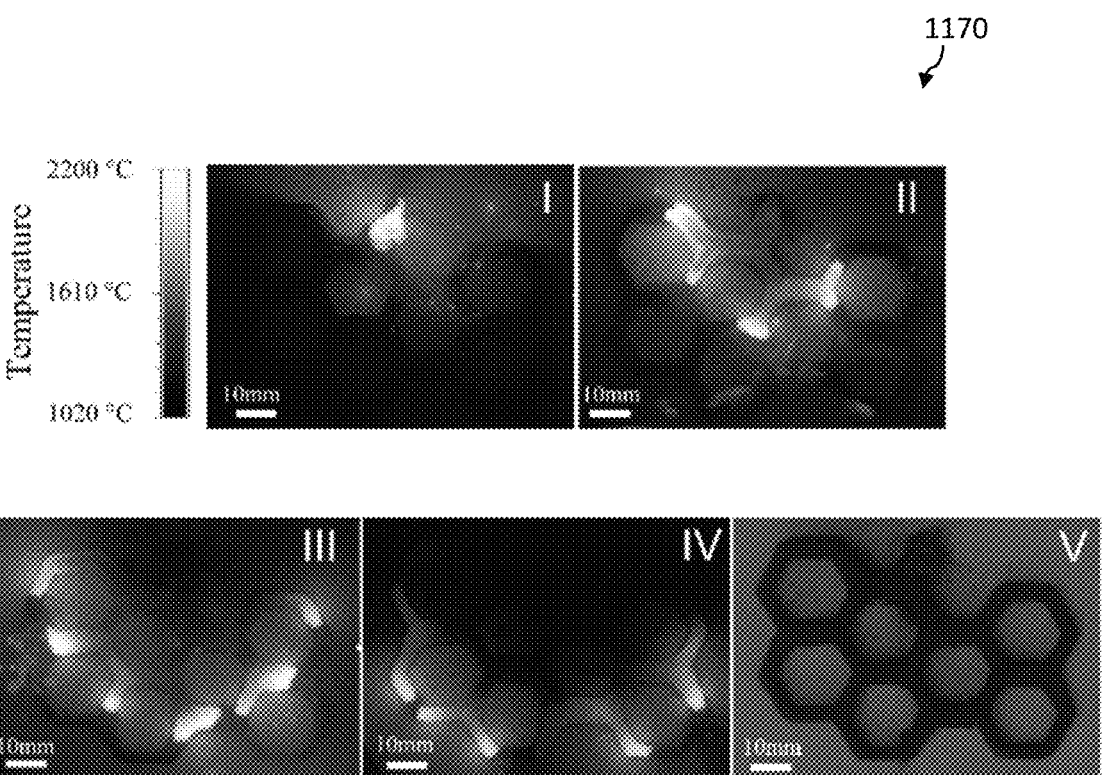
FIG. 8 are sequential thermal graphs of a self-sustaining ceramization process of a honeycomb ceramic preform sample, according to the present disclosure.

The reactive ink composition was designed by combining inorganic reactive powders with organic binders. Specifically, commercially available reactive elemental powders including titanium (Ti), silicon (Si) and graphite (C), and polycarbosilane-based preceramic oligomers are mixed homogeneously to produce reactive ink (diagram 1160, FIG. 7). Preceramic oligomers endow the ink with excellent rheological behaviors so that the mixture is readily suitable for extrusion-based 3D printing processes. Moreover, upon digitally controlled extrusion, UV light-induced photothermal effect can be easily applied for in-situ curing of reactive ink through crosslinking reaction of polycarbosilane preceramic oligomers, which defines the geometry of the reactive ceramic preform (diagram 1160, FIG. 7). Under completion of preform printing, the resultant green structure was converted to desired ceramic structures by the self-sustaining reaction process. With a single-point thermal trigger, an exothermic reaction between the ingredients as 3Ti+Si+2C→Ti3SiC2 rapidly pyrolyze preceramic polymers leaving consolidated ceramic parts with the desired structure (diagram 1160, FIG. 7). FIG. 8 includes a sequence of images 1170 capturing the self-sustaining ceramization of a honeycomb structure ceramic preform. Noticeably, the self-sustaining ceramization reaction proceeds from the triggering point and spread throughout the entire structure, rapidly and steadily transforming the printed preform into ceramic.

Figure 9A:
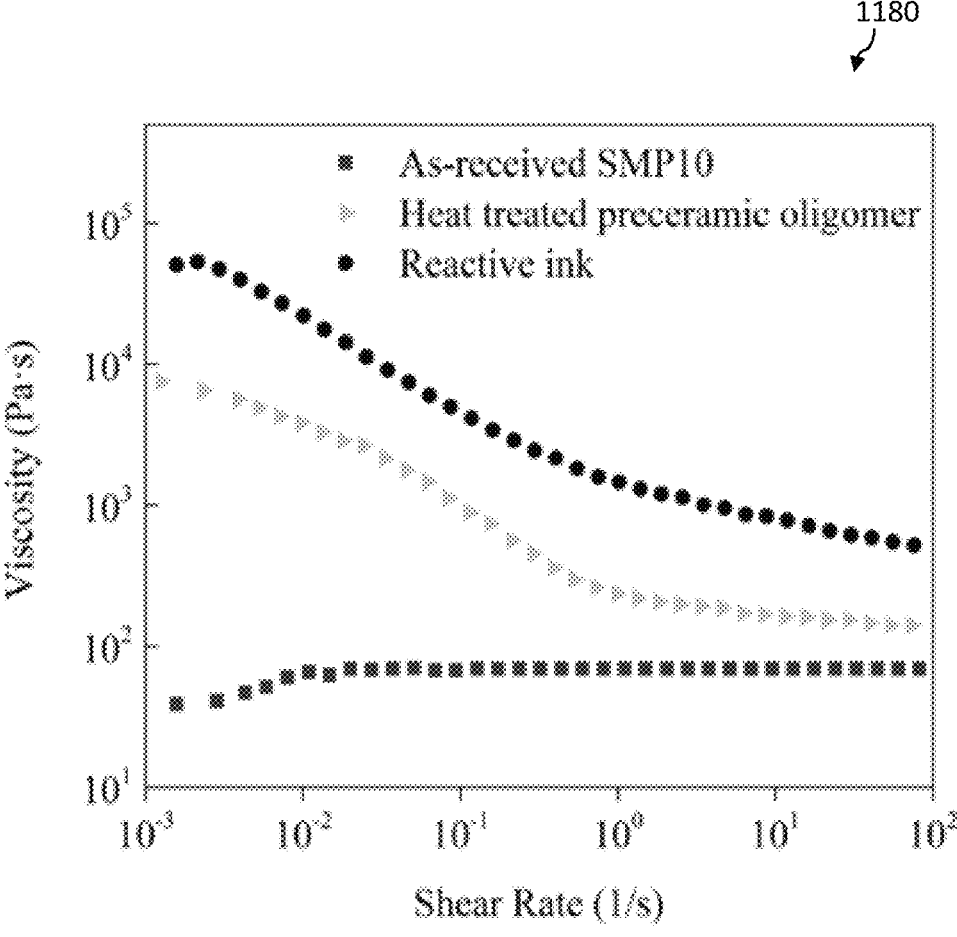
FIG. 9A is a diagram of rheological behavior of preceramic polymers, heat treated preceramic polymer, and reactive ink, according to the present disclosure.
Figure 9B:
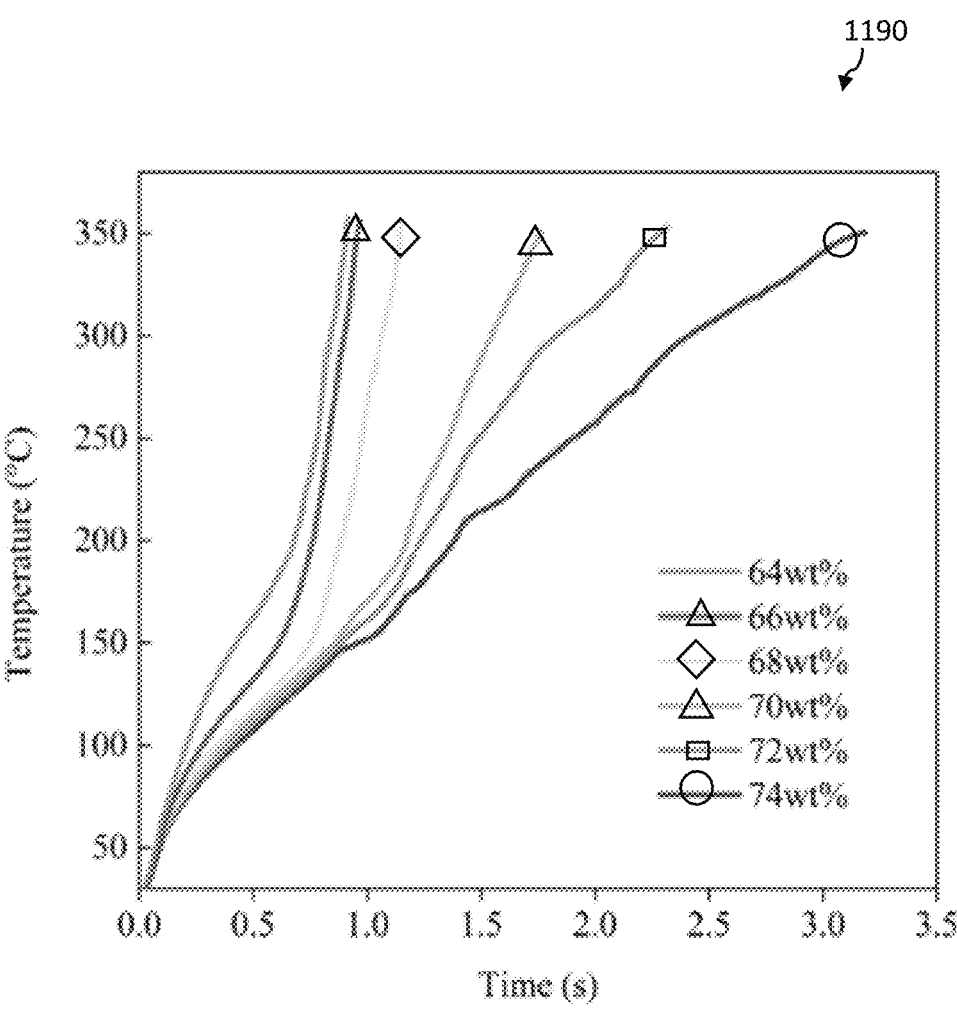
FIG. 9B is a diagram of a temperature profile of the reactive ink loaded with different amounts of micro-powders upon irradiation, according to the present disclosure.

The reactive ink was designed for subsequent freeform manufacturing processes including extrusion-based deposition and in-situ curing. For example, SMP10, a commercially available polycarbosilane-based preceramic polymer was selected as the binder for microscale powder reactants because of its good processability and high ceramic yield after pyrolysis. The rheological behavior of the reactive ink is critical for the storage and processibility of the reactive ink. However, the commercial of the shelf SMP10 cannot be readily used as a reactive ink binder due to its poor rheological behavior, which can be attributed to the intrinsic low molecular weight oligomers' lack of chain configuration dynamics. Thus, the chemical structure of the preceramic oligomer was carefully tuned by thermally activated crosslinking reaction so that polymer chain entanglement and disentanglement can be induced under dynamic shearing conditions. As a result, the micro-powder integrated preceramic polymer exhibits desired shear thinning behavior and is ready to be printed (diagram 1180, FIG. 9A). Equally important, the ability of REAP to fabricate a variety of complex geometries can also be attributed to the in-situ curing of the as-deposited reactive ink. Upon extrusion, UV irradiation fixed next to the nozzle quickly cures the deposited reactive ink, which can be attributed to the sharply raised temperature of the reactive ink (diagram 1190, FIG. 9B). It is found that the rate of heating is dependent on the concentration of micro-powders. A series of micro-powder loading ranging from 64 wt % to 74 wt % under the 13 $W/cm^2$ UV exposure was observed to have a photothermal heating rate ranging from ~130° C./s to 320° C./s, which promptly raises the reactive ink temperature towards the onset of curing temperature within 1.5 seconds. With increasing loading of micro-powders, the photothermal heating rate of the reactive ink decreases due to decreased UV absorption from preceramic polymer. The UV light absorption of reactive ink falls in the range of 300 nm-325 nm, and the absorption is weakened as the concentration of UV absorbing preceramic polymer decreased, which reduced the light heat conversion efficiency.

Figure 9C:
FIG. 9C is a diagram of a Fourier transform infrared (FTIR) spectra of the reactive ink, the photothermally cured preform, and the oven-cured preform, according to the present disclosure.
Figure 9C:
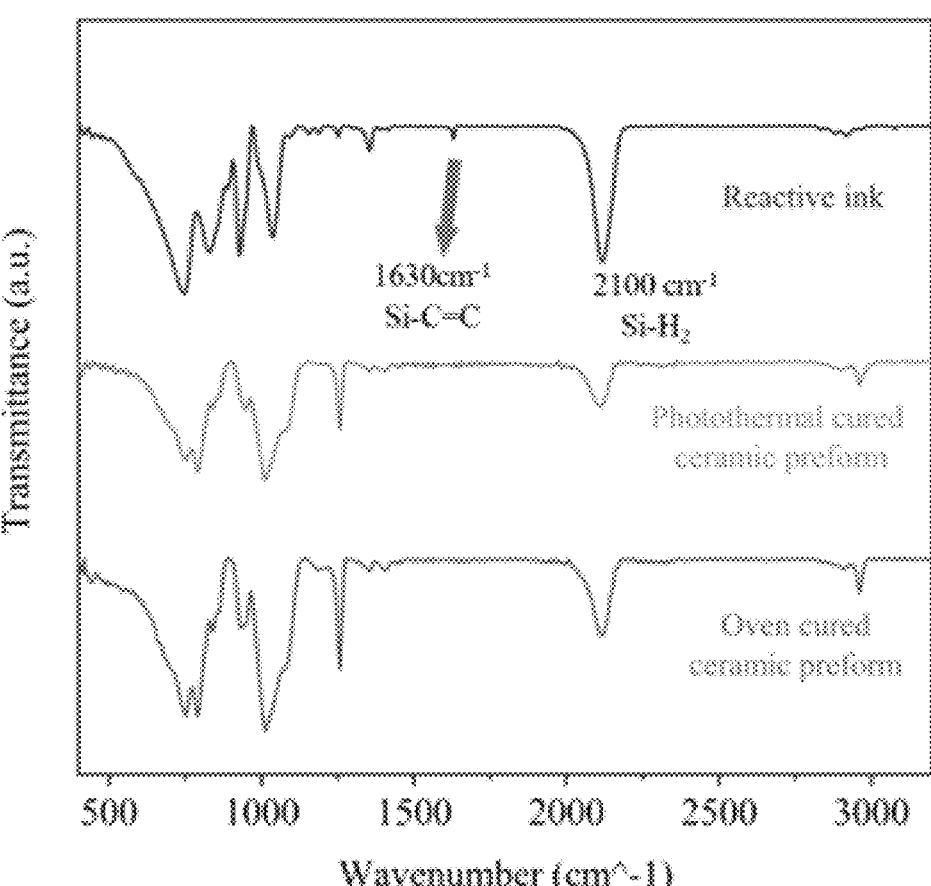
Figure 9D:
FIG. 9D is a diagram of a ceramic preforms processing map depicting the degree of cure corresponding to printing speed and UV power condition, according to the present disclosure.
Figure 9D:
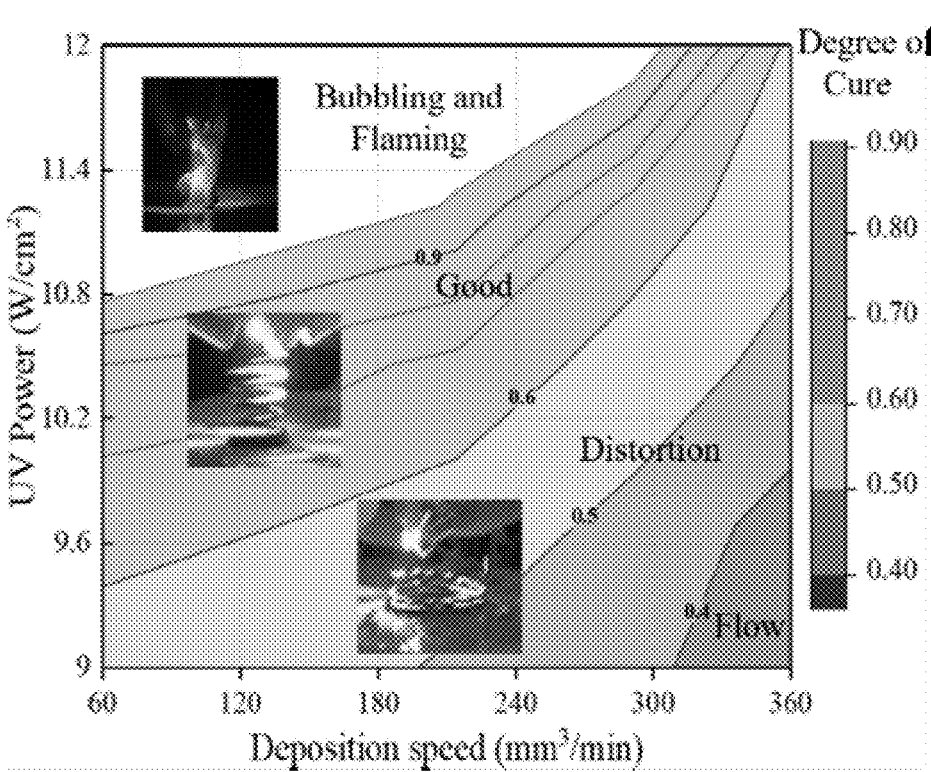

Notably, while low micro-powder loading favors a higher heating rate, which translates to a higher printing speed, the subsequent reactive ceramization process and final part performance could be undermined because insufficient reactants and excessive binder could induce porosity and defects. In this case, high micro-powder loading is preferred for better ceramic performance so 74% of micro-powder loading is selected for subsequent studies unless otherwise mentioned. To confirm The UV photothermal effect induced crosslinking, reactive ink, photothermally cured preform, and oven-cured preform specimens were investigated by FTIR spectroscopy. The peak at around 1630 $cm^{-1}$ corresponds to the vibration of the silicon-allyl (Si—C=C) bonds, and the absorption peak of the silicon-hydrogen (Si—H) bond locates at around 22. FIG. 9C includes a diagram 1200 showing the disappearance of the 1630 $cm^{-1}$ peak and reduced intensity of 2100 $cm^{-1}$ peak upon UV irradiation, suggesting effective crosslinking of polymer structures through the hydrosilylation process between Si—C=C double bond and hydrogens on silicon atoms. Similar changes were also observed on the oven-cured specimen, which indicated a similar effect of UV-induced photothermal curing and conventional oven curing. To better understand the dynamics of free-form fabrication, systematic printing experiments were conducted to construct the processing map of the ceramic preform free-form fabrication process (diagram 1210, FIG. 9D). With precise control of deposition rate and UV irradiation power, the synchronized deposition and curing allows REAP to fabricate high fidelity complex shape with overhanging structures.

Figure 10A:
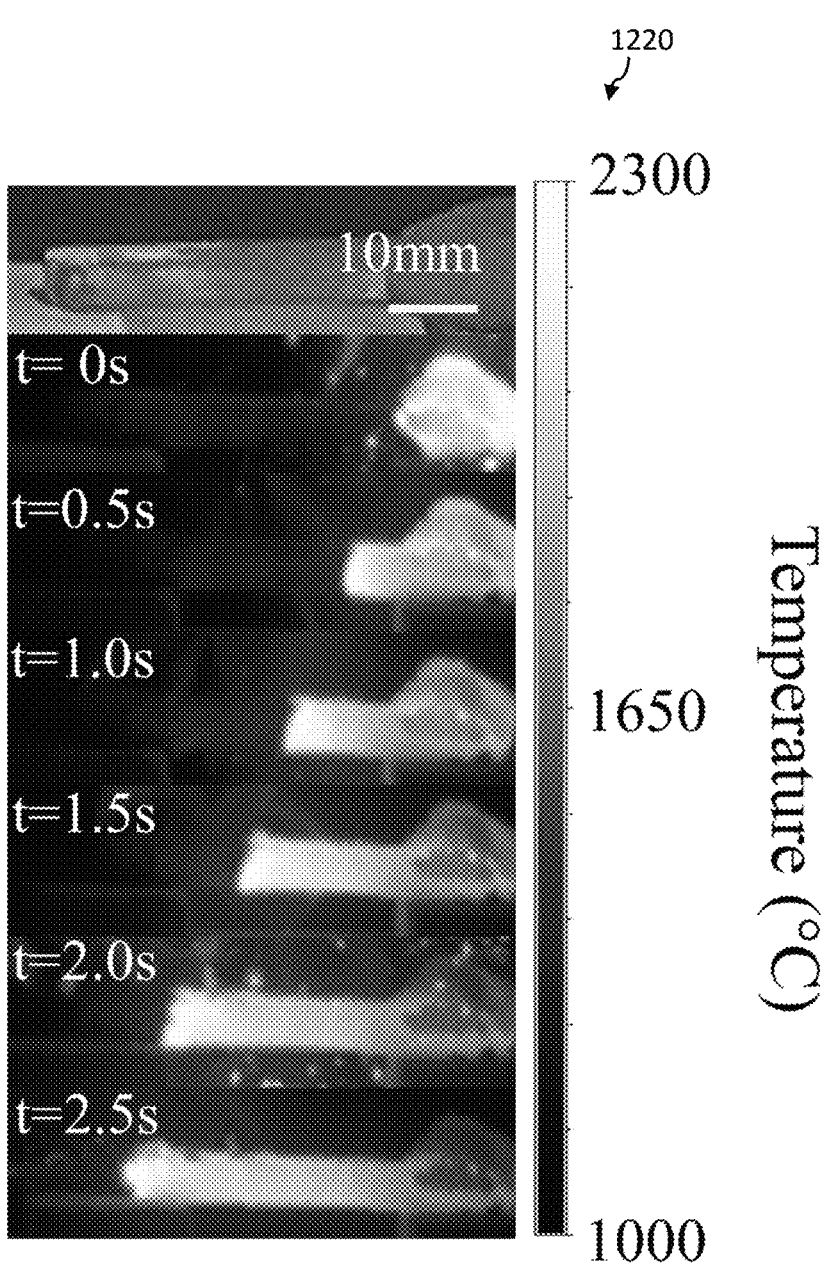
FIG. 10A is a series of time-resolved reaction thermal images obtained from experiment and simulation, according to the present disclosure.

The REAP is unique in its ability to manufacture ceramics rapidly and energy-efficiently with a self-sustaining ceramization reaction. The whole ceramization process requires negligible energy because transient thermal energy was supplied by a tungsten heater (e.g., 192 W power rating) for less than 10 seconds, and the rest of the reaction does not require additional energy input. Therefore, the ceramization reaction only requires less than 2000J energy input to complete. FIG. 10A includes a diagram 1220 showing the time-resolved thermal images of the propagation of a typical self-sustaining ceramization reaction that transforms the preform into ceramics. The reaction was marked by a fast and steadily propagating front with high front temperature. Thermochemical simulation of the self-sustaining ceramization reaction using the finite element method provides useful insight into the process.

Figure 10B:
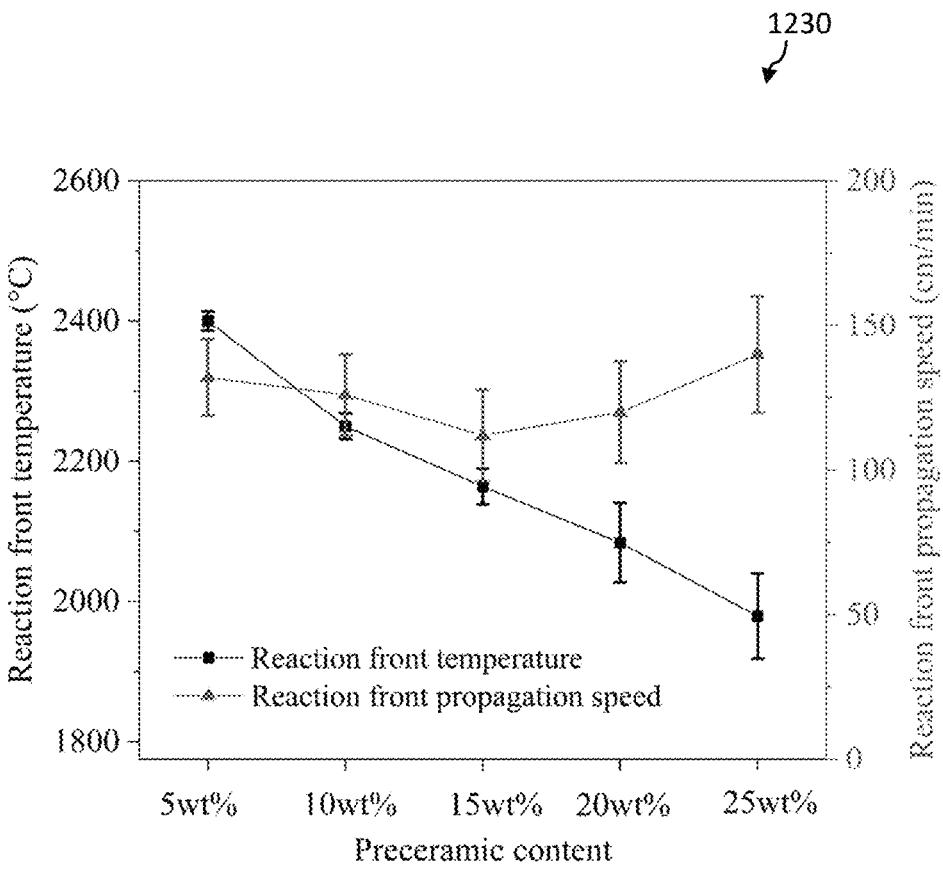
FIG. 10B is a diagram of a self-sustaining ceramization characteristics of the ceramic preform with different preceramic polymer content, according to the present disclosure.

It was revealed that the unique self-sustaining reaction feature could be attributed to the delicate balance among fast exothermic reaction kinetics among elemental powders, transient high temperature induced pyrolysis of preceramic polymers, and dynamic heat transfer within the system. As a result, the reaction front temperature was strongly dependent on the preceramic polymer content (diagram 1230, FIG. 10B). When the binder concentration increases, more released heat would be lost to pyrolyze the binder and simultaneously cause more pores within the sample. On the other hand, the reaction propagation velocity was $126 \pm 10.8$ cm/min, which was less influenced by the preceramic polymer content. The results indicate that less preceramic polymer binder might be desirable for high part quality. The final ceramic structure well preserved the geometrical integrity of the printed preforms.

Figure 10C:
FIG. 10C is a diagram of a pattern of specimens at a printed specimen stage of ceramization reaction, according to the present disclosure.
Figure 10C:
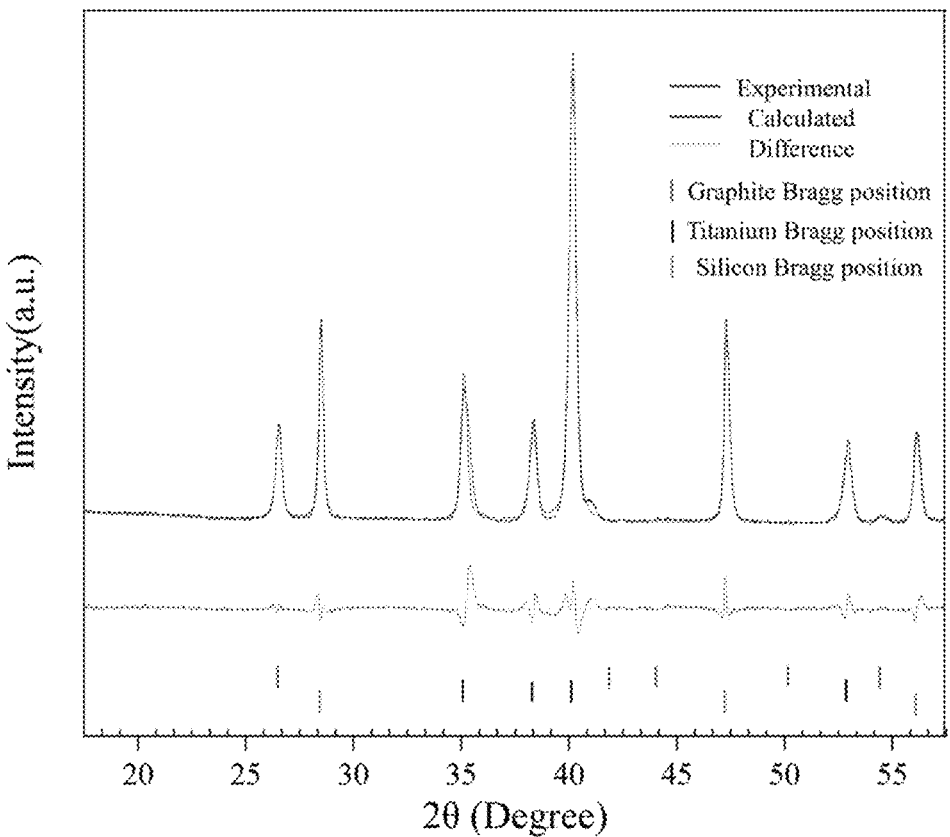
Figure 10D:
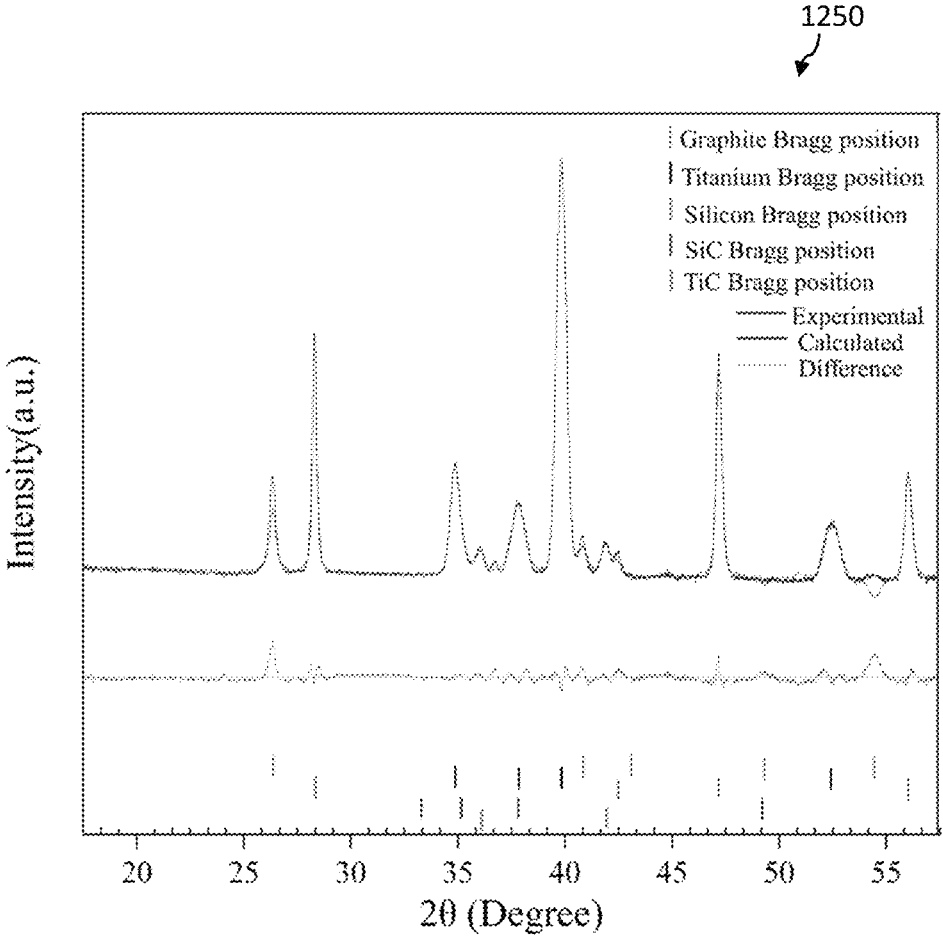
FIG. 10D is a diagram of a pattern of specimens at a preheating stage of ceramization reaction, according to the present disclosure.
Figure 10E:
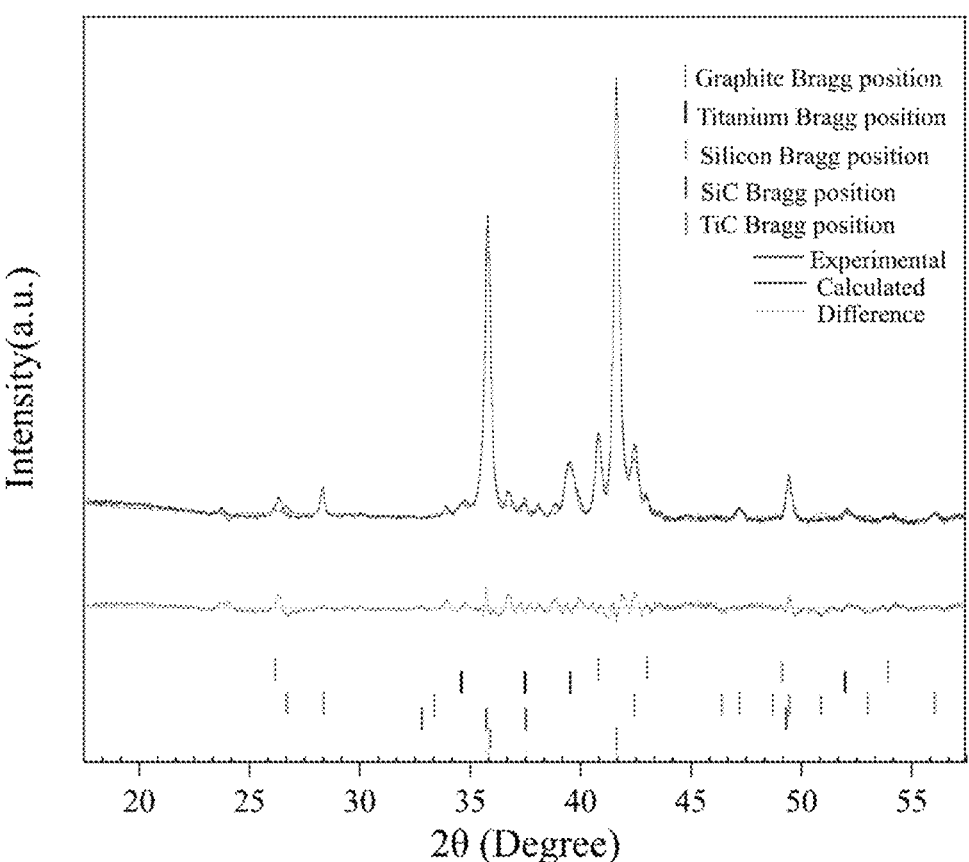
FIG. 10E is a diagram of a pattern of specimens at a reacting stage of ceramization reaction, according to the present disclosure.
Figure 10F:
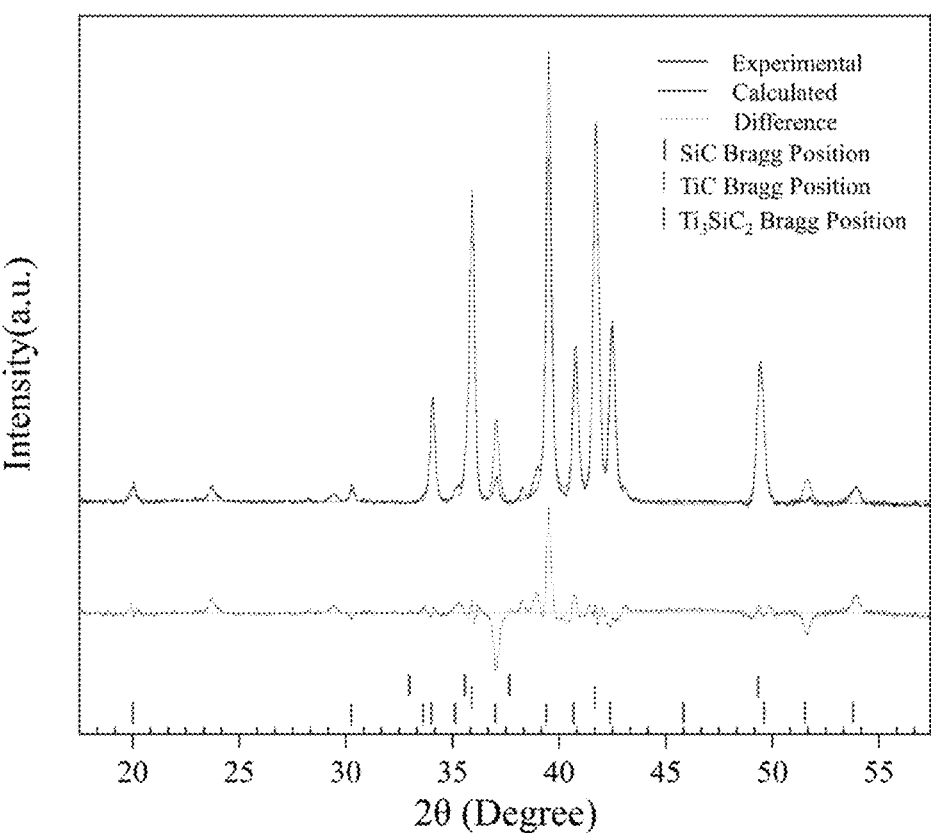
FIG. 10F is a diagram of a pattern of specimens at a naturally cooled stage of ceramization reaction, according to the present disclosure.
Figure 10G:
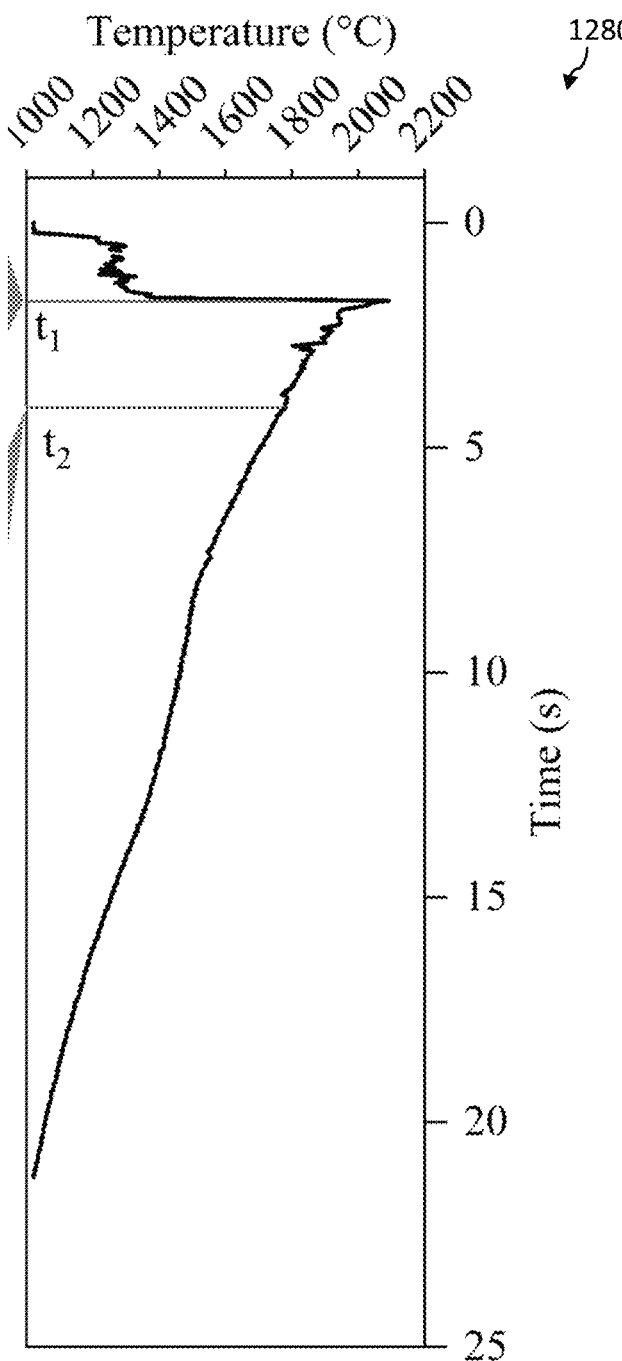
FIG. 10G is a diagram of a temperature of specimens during different stages of ceramization reaction, according to the present disclosure.

To better understand the mechanism of the rapid phase transformation of the ceramization process, the phase evolution at a different stage of the reaction was in-depth studied by reaction wave quenching. The quenched specimens were then analyzed by X-ray diffraction (XRD) (diagrams 1240, 1250, 1260, FIGS. 10C-10E). Specifically, before the reaction was initiated, the XRD pattern of the as-printed preform in FIG. 10C shows that it only contains phases that correspond to the elemental powder Ti, Si, and graphite, which suggests that the preform printing process did not introduce detectable reaction among elemental particles. As the reaction was initiated, the unreacted spot was first heated up by the propagating reaction front. It was observed that the preheating was marked by the formation of TiC and SiC phases (diagram 1250, FIG. 10D). Notably, since no previous phase evolution study on pure Ti—Si—C system observed the appearance of SiC at this stage, the formation of SiC could be attributed to the high-temperature pyrolysis of preceramic polymer. After the reaction front passed a spot, it would continue reacting until it cools down. During the post-front reaction stage (diagram 1260, FIG. 10E), the elemental phases were largely consumed, and the TiC phase grows quickly as indicated by the relative intensity of each corresponding peak. As the specimen cools down to room temperature naturally, no elemental species are detectable, and the $Ti_3SiC_2$ phase forms during the cooling stage (diagram 1270, FIG. 10F), which agrees with the previous studies. The final composition of the ceramic includes SiC, TiC, and $Ti_3SiC_2$ phases. To better understand the different stages of the phase evolution, the temperature profile is shown in diagram 1280, FIG. 10G, and the preheating stage and post-front reacting stages are marked as $t_1$ and $t_2$ moment, respectively.

Figure 11A:
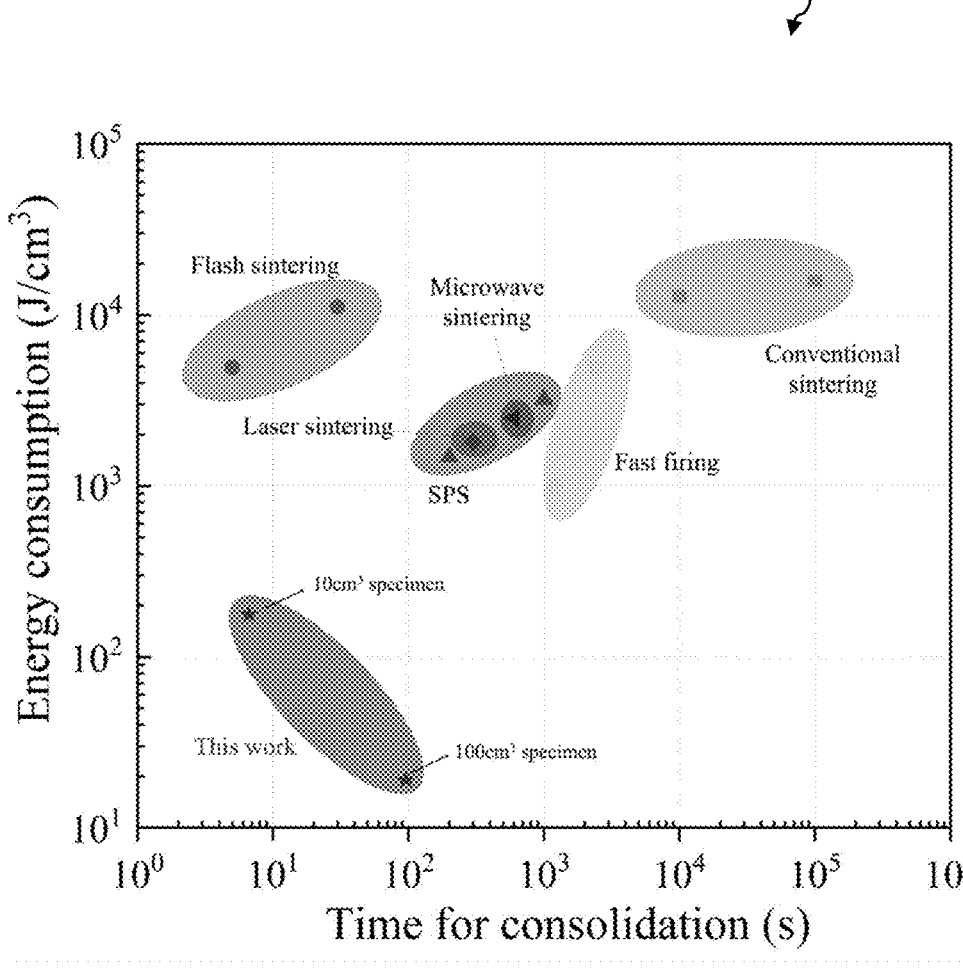
FIG. 11A is a diagram of manufacturing efficiency of the self-sustaining ceramization method compared to other ceramic consolidation methods in terms of specific energy consumption and duration of consolidation, according to the present disclosure.
Figure 11B:
FIG. 11B is a diagram of a $CO_2$ emission of sustaining ceramization reaction with a direct-ink writing-based freeform manufacturing compared to representative ceramic additive manufacturing technologies, according to the present disclosure.
Figure 11B:
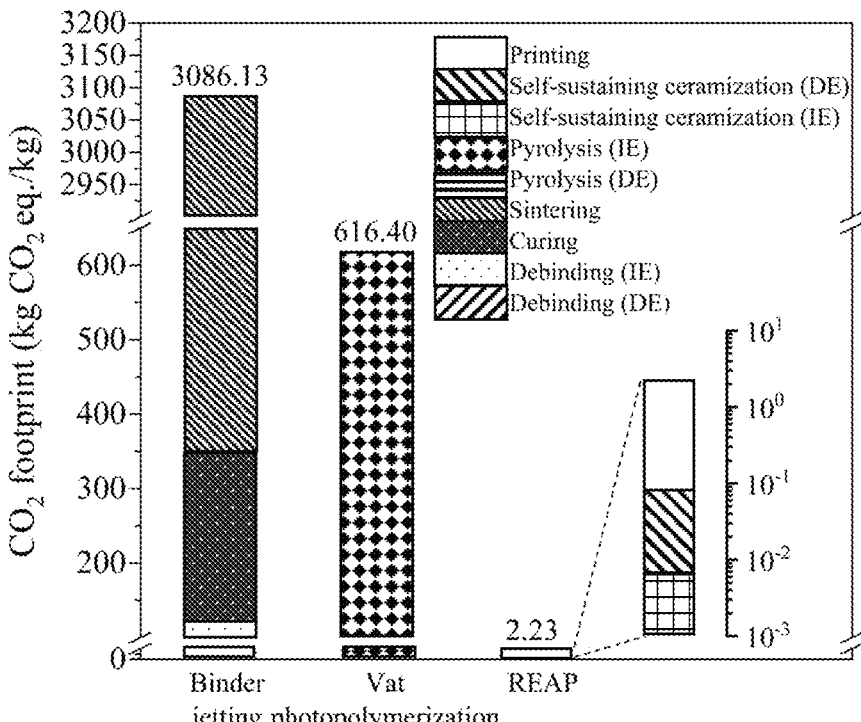

The REAP technology uniquely benefits the ceramic manufacturing industry by providing an energy-efficient and high-rate fabrication route for advanced ceramic materials. The energy consumption and consolidation time of the self-sustaining ceramization approach were compared to typical prior art methods, and the results are shown in diagram 1290 of FIG. 11A. Compared to the conventional furnace-based firing processes, the energy consumption of the self-sustaining ceramization for unit volume of ceramic consolidation decreases by 1000 times. In the meantime, the present disclosure also exhibited higher energy efficiency than other methods. Interestingly, for manufacturing of 10 $cm^3$ part, the normalized energy consumption was 192 $J/cm^3$, whereas a larger part (100 $cm^3$) exhibited a counter-intuitively less normalized energy consumption of 19.2 $J/cm^3$. The reason is that as the initial reaction (192 W thermal heating for 10 seconds) is the only energy input, the energy efficiency advantage scales with the size of the part. Meanwhile, the duration for consolidation of a 10 $cm^3$ sample took only 5 seconds, which is 1000 times faster compared to conventional sintering, which can be attributed to the fast kinetics of the self-sustaining ceramization reaction. Moreover, the environmental impact of the entire REAP process was compared to other representative ceramic additive manufacturing technologies in terms of equivalent $CO_2$ emission, and the results is presented in diagram 1300, FIG. 11B. It shows that the REAP process has an exceptionally low carbon footprint of only 2.23 kg $CO_2$ equivalent/kg. These findings suggest that REAP technology is may enhance the efficiency and sustainability of ceramic manufacturing.

Figure 11C:
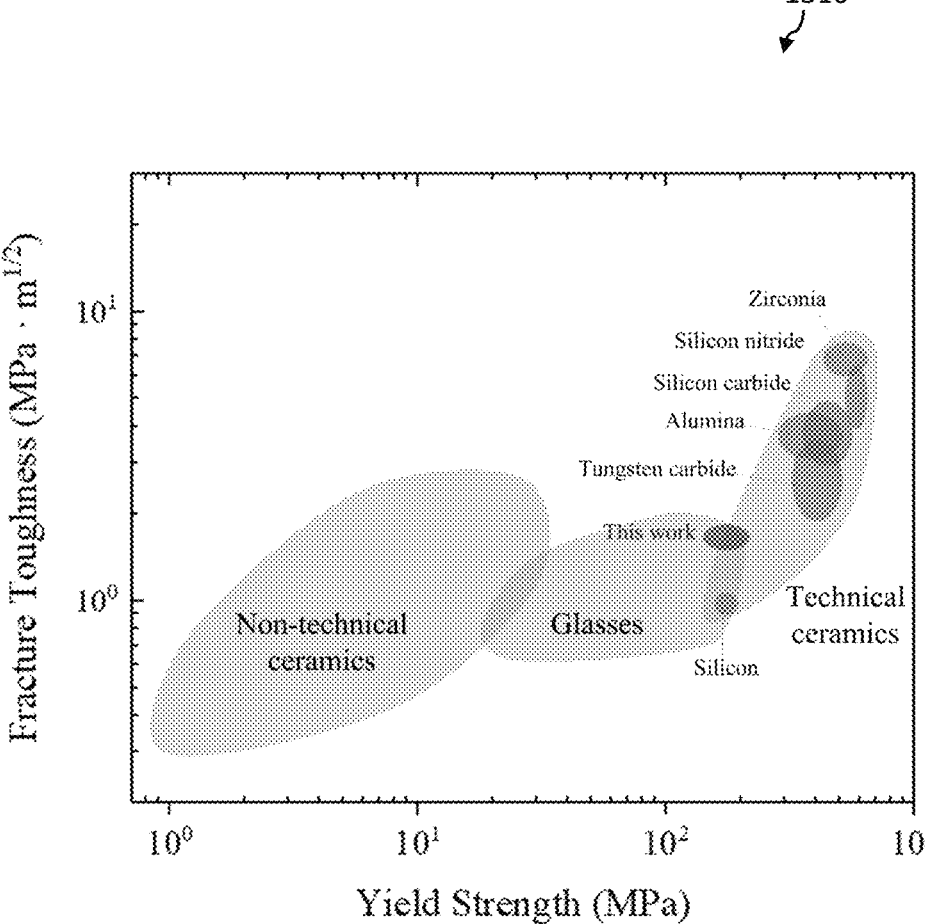
FIG. 11C is a diagram of an Ashby mapping of fracture toughness versus yield strength for various inorganic compounds, according to the present disclosure.
Figure 11D:
FIG. 11D is a diagram of an Ashby mapping of electrical conductivity versus density for state-of-the-art additively manufactured conductive ceramic structures, according to the present disclosure.
Figure 11D:
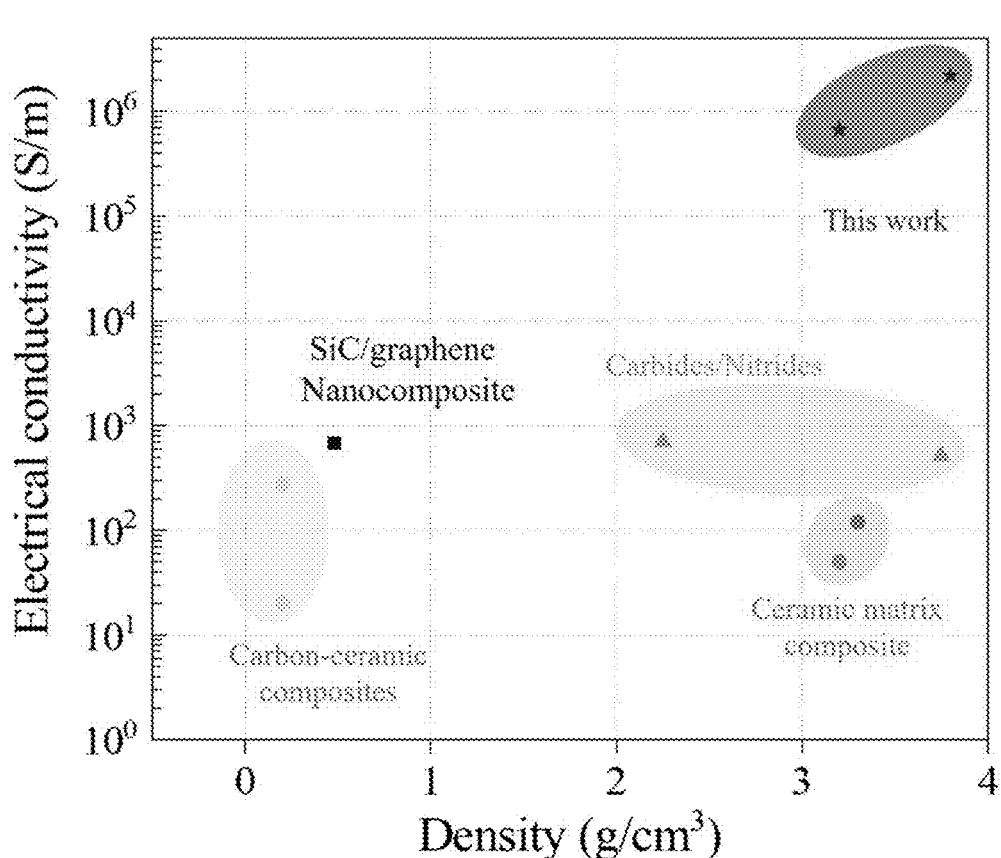

In addition, the mechanical performance of the REAP fabricated part was tested. The fracture toughness and yield strength of the REAP manufactured part could reach 1.7 MPa $m^{1/2}$ and $1.8 \times 10^2$ MP, respectively. Comparing these mechanical performances with other ceramic materials indicates that the disclosed REAP approach is suitable for manufacturing of technical-grade ceramics for high-performance applications (See diagram 1310, FIG. 11C). Furthermore, the REAP fabricated parts are not limited to structural applications. Such advanced ceramic structures are also highly electrically conductive. The electrical conductivity reached $2.2 \times 10^6$ S/m for the printed part. Compared to the state-of-the-art additive manufacturing fabricated ceramics, the result stands out as the most conductive 3D printed ceramic (See diagram 1320, FIG. 11D). In the elevated temperatures, the REAP fabricated part exhibits reduced electrical conductivity yet maintains high electrical conductivity, which is similar to MAX phase conductors. The electrical performance allows the printed ceramic structures to be applicable as refractory conductors. Moreover, SHS-related research has shown that there are hundreds of ceramic materials found to be potentially compatible with the process, including carbides, borides, oxides, nitrides, and so forth, which implies that the outcome of this research has a wide impact to the ceramic industries.

In the present disclosure, the present embodiments provide a rapid and energy-efficient approach for freeform manufacturing of advanced ceramic material structures based on self-sustaining ceramization of 3D printed ceramic preform including reactive elemental reactants and preceramic polymers. The reactive powder-integrated preceramic oligomers are extruded and deposited through in-situ curing, quickly fixing the geometry of the ceramic preform. The self-sustaining ceramization of the preform can be triggered by a transient energy input, then the energy is removed, and the reaction rapidly transforms elemental reactants and preceramic polymers into ceramic structures. Because of the rapid kinetics of the ceramization reaction, a 10 cm$^3$ preform could be converted to ceramic in less than 10 seconds with exceptionally low energy consumption of 19.2 J/cm$^3$. The whole manufacturing process demonstrated an unprecedentedly low carbon footprint of 2.23 kg CO$_2$ equivalent/kg part manufactured. REAP is capable of rapidly and energy-efficiently fabricating advanced ceramic structures with multifunctionalities, which could enable sustainable and efficient manufacturing of ceramic materials for new and powerful industrial applications.

The micro-powder reactants were prepared by mixing powders of Ti, Si, and graphite in a molar ratio of 3:1:2. Specifically, the mixing of powders was performed in ethanol suspension in an ultrasonication bath for 1 hour followed by mechanically stirring for 1 hour. To remove the ethanol, the suspension was then dried at 85° C. under mild mechanical stirring overnight until ethanol content is not detectable with differential scanning calorimetry. Before preparing the reactive ink, polycarbosilane-based preceramic oligomers (SMP10) were heat treated at 155° C. under vigorous stirring for 10 min to obtain the preceramic oligomer binder. A series of reactive inks with different concentrations of micro-powder reactants were prepared by mixing the preceramic oligomer binder and the micro-powder reactants. The reactive inks were denoted by the weight percent of micro-powder reactants.

Digital controlled extrusion of reactive ink was performed on a 3D Potter model Micro 10 with a 1 mm nozzle. A four-way light guide was fixed on the nozzle area with a self-made mount for in-situ curing. The degree of cure (a) for as fabricated preform was quantitatively characterized through Differential Scanning calorimetry (DSC) tests (TA instruments Q20). Firstly, a reference feedstock ink (unreacted ink) was prepared and then tested by DSC from room temperature to 350° C. at a heating rate of 5° C./min, and the heat of full reaction $\Delta H_{full}$ was obtained. Samples were obtained from different printed pieces at different locations along the direction of light illumination to characterize the degree of cure. Also, a small piece of samples from printed preforms under different printing speeds and irradiation powers were cut out and used for the DSC test. The residual heat of the reactions ($\Delta H_{residue}$) were from samples. Then the degree of cure values for photothermal in-situ curing was calculated by equation $$\alpha = 1 - \left(\frac{\Delta H_{residue}}{\Delta H_{full}}\right) \times 100\%$$

After ceramic preforms were fabricated, they were transported to an Argon gas-filled glove box. A tungsten basket heated by a DC power supply was used to initiate the self-sustaining reaction. After heating the ceramic preforms for ~10 seconds, the initiation of the self-sustaining reaction can be noticed by a bright glowing of the preform after which the tungsten heater was turned off immediately. Specimen with dimensions 50 mm×5 mm×5 mm were used for reaction characteristic studies. Characteristics of the self-sustaining reaction, including reaction front temperature and reaction propagating speed, were calculated from infrared recordings that compose of a time-resolved thermal map at a frame rate of 27 Hz.

The simulation of the present additive manufacturing approaches was carried out on COMSOL Multiphysics 6.0, a finite element analysis platform, to simulate the self-sustaining consolidation and pyrolysis process.

$$\rho C_p \frac{\partial T}{\partial t} = \rho H_r \frac{\partial \eta}{\partial t} + \lambda\left[\frac{\partial^2 T}{\partial r^2} + \frac{1}{r}\frac{\partial T}{\partial r} + \frac{\partial^2 T}{\partial z^2}\right] \tag{1}$$

$$\frac{\partial \eta}{\partial t} = A_0(1 - \eta)\exp\left(-\frac{E_a}{RT}\right) \tag{2}$$

$$\frac{\partial \eta_d}{\partial t} = A_0(1 - \eta_d)^n\exp\left(-\frac{E_a\_SMP}{RT}\right) \tag{3}$$

where T is the temperature in Kelvin (K); $\eta$ represents the degree of conversion of reactant powders and is dimensionless; $\rho$, and $C_p$ denotes density and heat capacity of the powder reactants, respectively; $H_r$ is the enthalpy of reaction for Ti—Si—C system. In equation (2), the conversion rate $$\frac{\partial \eta}{\partial t}$$

for the Ti—Si—C system is described. $A_0$ is the reaction rate constant, $(1-\eta)$ is simply used here as the conversion function, which reflects the reaction mechanism; $E_a$ and R respectively are the activation energy and universal gas constant. In equation (3), the rate of decomposition for preceramic polymers $$\frac{\partial \eta_d}{\partial t}$$

is described. The thermal conductivity of the ceramic preform was measured by Hot Disc thermal conductivity analysis. The heat capacity was obtained from DSC (TA instruments Q20). The density of the ceramic preform was measured from a standard sample by taking the mass divided by the volume of the sample.

Referring now again to FIG. 1, an additive manufacturing apparatus 100 according to the present disclosure is now described. The additive manufacturing apparatus 100 illustratively includes a plurality of powder supplies 101$a$-101$b$, and a preceramic binder supply 102. In particular, the plurality of powder supplies 101$a$-101$b$ may comprise a plurality of inorganic reactive powder supplies. For example, the plurality of inorganic reactive powder supplies may comprise one or more of silicon powder, graphite powder, amorphous carbon powder, titanium powder, and silicon carbide powder. Also, the preceramic binder supply 102 may comprise a preceramic oligomer binder supply or a monomeric preceramic binders. For example, the preceramic oligomer binder supply may comprise a polycarbosilane preceramic binder.

The additive manufacturing apparatus 100 illustratively includes a mixer device 103 downstream from the plurality of powder supplies 101$a$-101$b$ and the preceramic binder supply 102 and configured to generate a powder-integrated preceramic mixture 108. By weight, the powder-integrated preceramic mixture 108 may comprise between 15% to 55% of the preceramic binder to reactive ink. The mixer device 103 is configured to generate a homogeneous mixture of the plurality of powder supplies 101$a$-101$b$ and the preceramic binder supply 102 to produce reactive ink.

The additive manufacturing apparatus 100 also includes a nozzle device 104 downstream from the mixer device 103. The nozzle device 104 illustratively comprises an input funnel 105 coupled to an output of the mixer device 103, and a mixing chamber 106 coupled downstream from the input funnel. The mixing chamber 106 comprises a motor 107, and an auger 110 powered by the motor. In some embodiments, the nozzle device 104 may comprise a heating device configured to heat the reactive ink.

The nozzle device 104 is configured to output/dispense the powder-integrated preceramic mixture 108 on a substrate 109. In particular, the powder-integrated preceramic mixture comprises a reactive powder-integrated preceramic oligomer.

The additive manufacturing apparatus 100 also includes a heat source 111 configured to heat the powder-integrated preceramic mixture to initiate a self-sustainable ceramization reaction to generate a ceramic matrix composite. The heat source 111 may comprise a resistive heating device (e.g., resistive heating basket), or an IR laser. For example, the heat source 111 may be configured to heat the powder-integrated preceramic mixture for set time period and deliver less than 2000 Joules of energy to initiate the self-sustainable ceramization reaction. Advantageously, the additive manufacturing apparatus 100 consumes less power during the manufacturing process.

Additionally, the additive manufacturing apparatus 100 illustratively comprises an UV radiation source 112 configured to cure the powder-integrated preceramic mixture before initiating a self-sustainable ceramization reaction. In some embodiments, the UV radiation source 112 may comprise one or more UV lasers.

Figure 12:
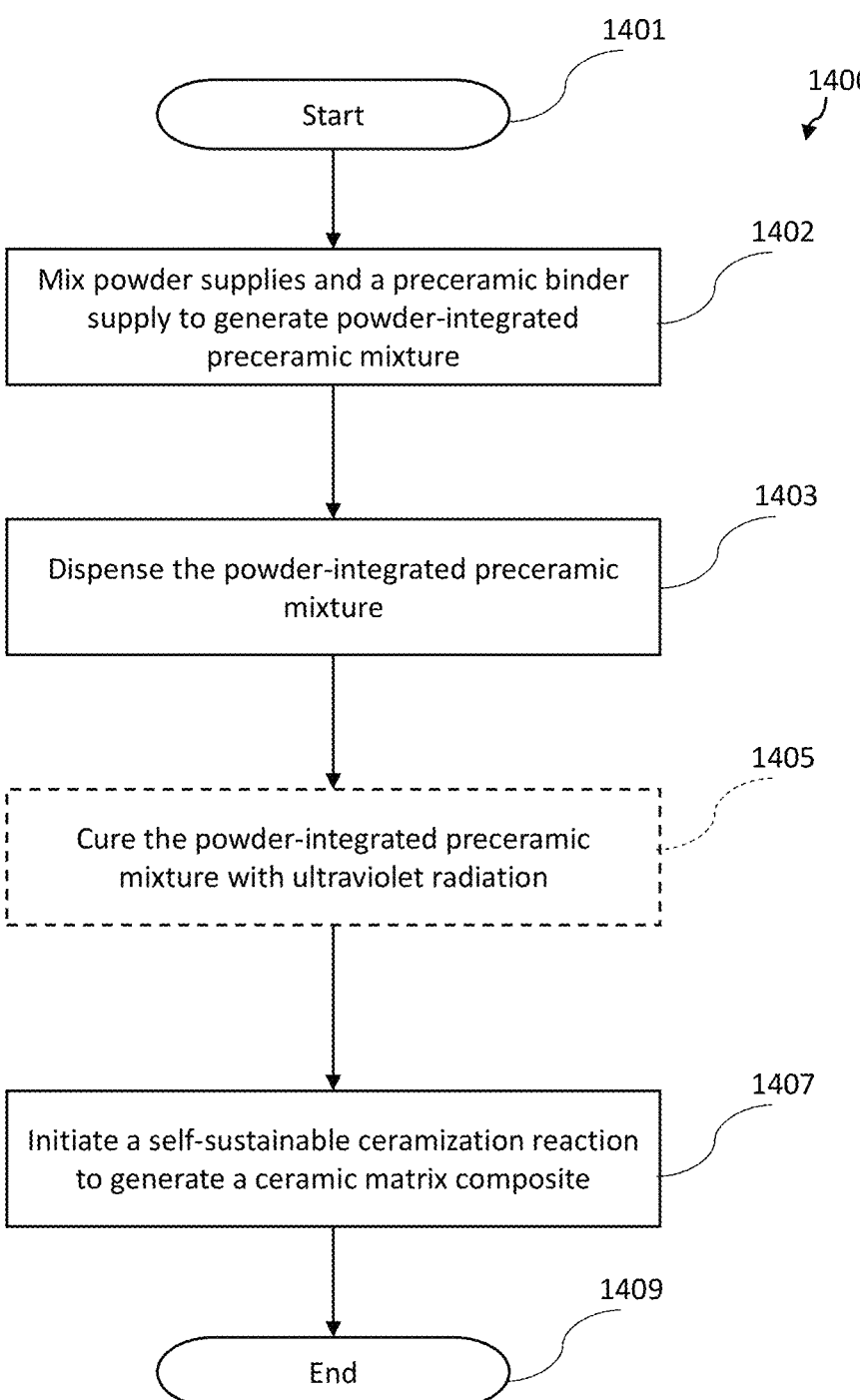
FIG. 12 is a flowchart of a method for additive manufacturing, according to the present disclosure.

Referring now additionally to FIG. 12, a method for additive manufacturing according to the present disclosure is now described with reference to a flowchart 1400, which begins at Block 1401. The method comprises operating a mixer device 103 downstream from a plurality of powder supplies 101*a*-101*b* and a preceramic binder supply 102 and configured to generate a powder-integrated preceramic mixture (Block 1402), and operating a nozzle device 104 downstream from the mixer device and configured to output the powder-integrated preceramic mixture 108 (Block 1403). In some embodiments, the method may include curing the powder-integrated preceramic mixture 108 with UV radiation, noted with dashed lines at Block 1405. The method also includes operating a heat source 111 configured to heat the powder-integrated preceramic mixture to initiate a self-sustainable ceramization reaction to generate a ceramic matrix composite. (Block 1407). The method ends at Block 1409.

Referring now additionally to FIGS. 2A-2B, another embodiment of the additive manufacturing apparatus 200 is now described. In this embodiment of the additive manufacturing apparatus 200, those elements already discussed above with respect to FIG. 1 are incremented by 100 and most require no further discussion herein. This embodiment differs from the previous embodiment in that this additive manufacturing apparatus 200 illustratively includes a fiber supply 220 configured to feed a continuous fiber 221 into the nozzle device 204 to be dispensed within the powder-integrated preceramic mixture 208. As perhaps best seen in FIG. 2B, the continuous fiber 221 is surrounded by the powder-integrated preceramic mixture 208.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An additive manufacturing apparatus comprising:
a plurality of powder supplies;
a preceramic binder supply;
a mixer device downstream from the plurality of powder supplies and the preceramic binder supply and configured to generate a powder-integrated preceramic mixture;
a fiber supply configured to output a continuous fiber;
a nozzle device downstream from the mixer device and the fiber supply, the nozzle device configured to receive the continuous fiber and output the powder-integrated preceramic mixture surrounding the continuous fiber; and
an infrared laser source configured to apply a transient thermal initiation energy to the powder-integrated preceramic mixture to initiate a self-sustainable ceramization reaction to generate a ceramic matrix composite, the transient thermal initiation energy having a duration less than 5 seconds.

2. The additive manufacturing apparatus of claim 1 wherein the powder-integrated preceramic mixture comprises a reactive powder-integrated preceramic oligomer.

3. The additive manufacturing apparatus of claim 1 wherein the nozzle device includes an input funnel coupled to an output of the mixer device, and a mixing chamber coupled downstream from the input funnel.

4. The additive manufacturing apparatus of claim 3 wherein the mixing chamber comprises a motor, and an auger powered by the motor.

5. The additive manufacturing apparatus of claim 1 wherein the plurality of powder supplies comprises a plurality of inorganic reactive powder supplies.

6. The additive manufacturing apparatus of claim 1 wherein the preceramic binder supply comprises a preceramic oligomer binder supply.

7. The additive manufacturing apparatus of claim 1 further comprising an ultraviolet radiation source configured to cure the powder-integrated preceramic mixture before initiating a self-sustainable ceramization reaction.

8. The additive manufacturing apparatus of claim 1 wherein the infrared laser source is configured to heat the powder-integrated preceramic mixture for set time period and deliver less than 2000 Joules of energy to initiate the self-sustainable ceramization reaction.

9. An additive manufacturing apparatus comprising:
a plurality of powder supplies;
a preceramic binder supply;
a mixer device downstream from the plurality of powder supplies and the preceramic binder supply and configured to generate a reactive powder-integrated preceramic oligomer;
a fiber supply configured to output a continuous fiber;
a nozzle device downstream from the mixer device and the fiber supply, the nozzle device configured to receive the continuous fiber and comprising
an input funnel coupled to an output of the mixer device, and
a mixing chamber coupled downstream from the input funnel and configured to output the reactive powder-integrated preceramic oligomer surrounding the continuous fiber; and an infrared laser source configured to apply a transient thermal initiation energy to the reactive powder-integrated preceramic oligomer to initiate a self-sustainable ceramization reaction to generate a ceramic matrix composite, the transient thermal initiation energy having a duration less than 5 seconds.

10. The additive manufacturing apparatus of claim 9 wherein the mixing chamber comprises a motor, and an auger powered by the motor.

11. The additive manufacturing apparatus of claim 9 wherein the plurality of powder supplies comprises a plurality of inorganic reactive powder supplies.

12. The additive manufacturing apparatus of claim 9 wherein the preceramic binder supply comprises a preceramic oligomer binder supply.

13. The additive manufacturing apparatus of claim 9 further comprising an ultraviolet radiation source configured to cure the reactive powder-integrated preceramic oligomer before initiating a self-sustainable ceramization reaction.

14. The additive manufacturing apparatus of claim 9 wherein the infrared laser source is configured to heat the reactive powder-integrated preceramic oligomer for set time period and deliver less than 2000 Joules of energy to initiate the self-sustainable ceramization reaction.

15. A three-dimensional (3D) printing device comprising:
a plurality of powder supplies;
a preceramic binder supply;
a mixer device downstream from the plurality of powder supplies and the preceramic binder supply and configured to generate a powder-integrated preceramic mixture;
a fiber supply configured to output a continuous fiber;
a nozzle device downstream from the mixer device and the fiber supply, the nozzle device configured to receive the continuous fiber and comprising
  an input funnel coupled to an output of the mixer device, and a mixing chamber coupled downstream from the input funnel and configured to output the powder-integrated preceramic mixture surrounding the continuous fiber;
an ultraviolet radiation source configured to cure the powder-integrated preceramic mixture before initiating a self-sustainable ceramization reaction; and
an infrared laser source configured to apply transient thermal initiation energy to the powder-integrated preceramic mixture to initiate the self-sustainable ceramization reaction to generate a ceramic matrix composite, the transient thermal initiation energy having a duration less than 5 seconds.

16. The 3D printing device of claim 15 wherein the plurality of powder supplies comprises a plurality of inorganic reactive powder supplies.

17. The 3D printing device of claim 15 wherein the infrared laser source is configured to heat the powder-integrated preceramic mixture for set time period and deliver less than 2000 Joules of energy to initiate the self-sustainable ceramization reaction.

18. The additive manufacturing apparatus of claim 1 wherein the infrared laser source configured to apply the transient thermal initiation energy to initiate the self-sustainable ceramization reaction at a triggering point, the self-sustainable ceramization reaction spreading through an entire structure of the ceramic matrix composite.

19. The additive manufacturing apparatus of claim 9 wherein the infrared laser source configured to apply the transient thermal initiation energy to initiate the self-sustainable ceramization reaction at a triggering point, the self-sustainable ceramization reaction spreading through an entire structure of the ceramic matrix composite.

20. The 3D printing device of claim 15 wherein the infrared laser source configured to apply the transient thermal initiation energy to initiate the self-sustainable ceramization reaction at a triggering point, the self-sustainable ceramization reaction spreading through an entire structure of the ceramic matrix composite.

\* \* \* \* \*